United States Patent
Habibian et al.

(10) Patent No.: US 10,964,033 B2
(45) Date of Patent: Mar. 30, 2021

(54) DECOUPLED MOTION MODELS FOR OBJECT TRACKING

(71) Applicant: QUALCOMM Incorporated, San Diego, CA (US)

(72) Inventors: Amirhossein Habibian, Amsterdam (NL); Daniel Hendricus Franciscus Dijkman, Haarlem (NL); Antonio Leonardo Rodriguez Lopez, Naarden (NL); Yue Hei Ng, Silver Spring, MD (US); Koen Erik Adriaan Van De Sande, Breukelen (NL); Cornelis Gerardus Maria Snoek, Volendam (NL)

(73) Assignee: Qualcomm Incorporated, San Diego, CA (US)

( * ) Notice: Subject to any disclaimer, the term of this patent is extended or adjusted under 35 U.S.C. 154(b) by 253 days.

(21) Appl. No.: 16/057,690

(22) Filed: Aug. 7, 2018

(65) Prior Publication Data
US 2020/0051254 A1 Feb. 13, 2020

(51) Int. Cl.
*G06T 7/246* (2017.01)
*G06T 7/73* (2017.01)
(Continued)

(52) U.S. Cl.
CPC .............. *G06T 7/251* (2017.01); *G06N 3/08* (2013.01); *G06N 7/005* (2013.01); *G06T 7/75* (2017.01); *G06T 2207/20081* (2013.01)

(58) Field of Classification Search
CPC G06T 7/251; G06T 7/75; G06T 7/005; G06T 2207/20081; G06N 3/08; G06N 3/005
See application file for complete search history.

(56) References Cited

U.S. PATENT DOCUMENTS 9,817,399 B2 11/2017 Braunstein et al.
2007/0065025 A1* 3/2007 Paniconi .................. G06T 7/11
382/236
(Continued)

FOREIGN PATENT DOCUMENTS

WO 2016156236 A1 10/2016

OTHER PUBLICATIONS

Dequaire, Julie "Deep tracking in the wild: End-to-end tracking using recurrent neural networks" The International Journal of Robotics Research (Year: 2017).*
(Continued)

*Primary Examiner* — Kim Y Vu
*Assistant Examiner* — Molly Delaney
(74) *Attorney, Agent, or Firm* — Edward J. Meisarosh

(57) ABSTRACT

A visual tracker may track an object by identifying the object in a frame, and the visual tracker by identify the object in the frame within a search region. The search region may be provided by a motion modeling system that independently models the motion of the object and models the motion of the camera. For example, an object motion model of the motion modeling system may first model the motion of the object, assuming the camera is not in motion, in order to identify the expected position of the object. A camera motion model of the motion modeling system may then update the expected position of the object, obtained from the object motion model, based on the motion of the camera.

30 Claims, 13 Drawing Sheets

(51) Int. Cl.
*G06N 3/08* (2006.01)
*G06N 7/00* (2006.01)

(56) References Cited

U.S. PATENT DOCUMENTS

| | | | |
|---|---|---|---|
| 2008/0063236 A1* | 3/2008 | Ikenoue | G06T 7/277 |
| | | | 382/103 |
| 2013/0236047 A1* | 9/2013 | Zeng | G06K 9/00805 |
| | | | 382/103 |
| 2015/0363940 A1* | 12/2015 | Held | G06T 7/207 |
| | | | 382/107 |
| 2017/0053169 A1 | 2/2017 | Cuban et al. | |
| 2017/0177937 A1 | 6/2017 | Harmsen et al. | |
| 2017/0228878 A1* | 8/2017 | Goldman | G06T 7/75 |
| 2019/0244366 A1* | 8/2019 | Yu | G06N 5/046 |

OTHER PUBLICATIONS

SKYDIO: "The Most Advanced Autonomous Device—of Any Kind—Available Today", 2018, 5 Pages.

* cited by examiner

DECOUPLED MOTION MODELS FOR OBJECT TRACKING

BACKGROUND

Field

Certain aspects of the present disclosure generally relate to machine learning and, more particularly, to improving systems and methods of tracking an object using motion models.

Background

An artificial neural network, which may include an interconnected group of artificial neurons (e.g., neuron models), is a computational device or represents a method to be performed by a computational device.

Convolutional neural networks are a type of feed-forward artificial neural network. Convolutional neural networks may include collections of neurons that each has a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks (DNNs) may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may be fine-tuned using back propagation.

Other models are also available for object recognition. For example, support vector machines (SVMs) are learning tools that can be applied for classification. Support vector machines include a separating hyperplane (e.g., decision boundary) that categorizes data. The hyperplane is defined by supervised learning. A desired hyperplane increases the margin of the training data. In other words, the hyperplane should have the greatest minimum distance to the training examples.

Although these solutions achieve excellent results on a number of classification benchmarks, their computational complexity can be prohibitively high. Additionally, training of the models may be challenging.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

Systems that include the capabilities to track objects in a field of view are increasingly common. For example, automobiles may include a system with one or more cameras for autonomous driving, e.g., in order to understand the trajectories of other automobiles, pedestrians, etc. In another example, drones may include object-tracking systems, e.g., in order to follow a specific object and/or to avoid moving or dynamic obstacles. In another example, Internet-enabled cameras may include object-tracking systems, e.g., in order to follow a specific person and/or to improve activity recognition. In another example, service robots may include object-tracking systems, e.g., in order to track faces and/or for interaction with persons.

With object-tracking systems, the camera is oftentimes not stationary. Therefore, both the movement of the object and the movement of the camera(s) that capture the object may affect how the objected is tracked. In some cases, modeling both the movement of the object and the movement of the camera using one model may be difficult. For example, a model that includes both the object motion and the camera motion may estimate a relatively large search region. A visual tracker that is to detect the object in the search region may experience difficulty and/or a relatively large overhead when tracking an object in such a large search region. Additionally, training of systems that contemporaneously model both the movement of the object and the movement of the camera using one model may need relatively large training data sets in order to cover many variations of camera motion and object motion. Therefore, a need exists to improve models for estimating a search region in which an object may be found, e.g., in order to improve the performance of a visual tracker.

In an aspect of the disclosure, a method, a computer readable medium, and apparatus for operating a computational network are provided. In various aspects, the apparatus may be configured to obtain first image data that depicts at least a portion of an object that is in first motion over a set of previous time steps, and the first image data may be obtained from an image sensor that is in second motion over the set of previous time steps. The apparatus may determine, using a first motion model, an expected position at a future time step of the object that is in the first motion based on the first motion over the set of previous time steps. The apparatus may adjust, using a second motion model, the determined expected position of the object based on the second motion of the image sensor over the set of previous time steps. The apparatus may output the expected position of the object for tracking of the object in second image data corresponding to a future time step.

In one aspect, the expected position of the object indicates a search region for a future frame at the future time step. In one aspect, the first motion model may include an object motion model that is based on absence of the second motion of the image sensor over the set of previous time steps. In one aspect, the object motion model include at least one of a recurrent neural network (RNN) or a Bayesian filter. In one aspect, the determination, using the first motion model, of the expected position at the future time step of the object that is in the first motion based on the first motion over the set of previous time steps may include modeling the first motion of the object based on at least one of a constant velocity or a constant acceleration associated with the object over the set of previous time steps. In one aspect, the second motion model may include a camera motion model that models the second motion of the image sensor over the set of previous time steps. In one aspect, the camera motion model may model the second motion of the image sensor over the set of previous time steps based on at least one of visual odometry or inertial odometry. In one aspect, the adjusting, using the second motion model, the determined expected position of the object based on the second motion of the image sensor over the set of previous time steps may include obtaining one or more measurements indicating the second motion in three-dimensional coordinate space, translating the one or more measurements from the three-dimensional coordinate space to two-dimensional coordinate space, and adjusting the expected position based on the one or more measurements translated to the two-dimensional coordinate space. In one aspect, the first motion model may be trained independently from the second motion model based on a first set of training data that indicates a fixed position of the image sensor. In one aspect, the apparatus may further identify, based on the expected position of the object, the object depicted in the second image data at the future time step.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
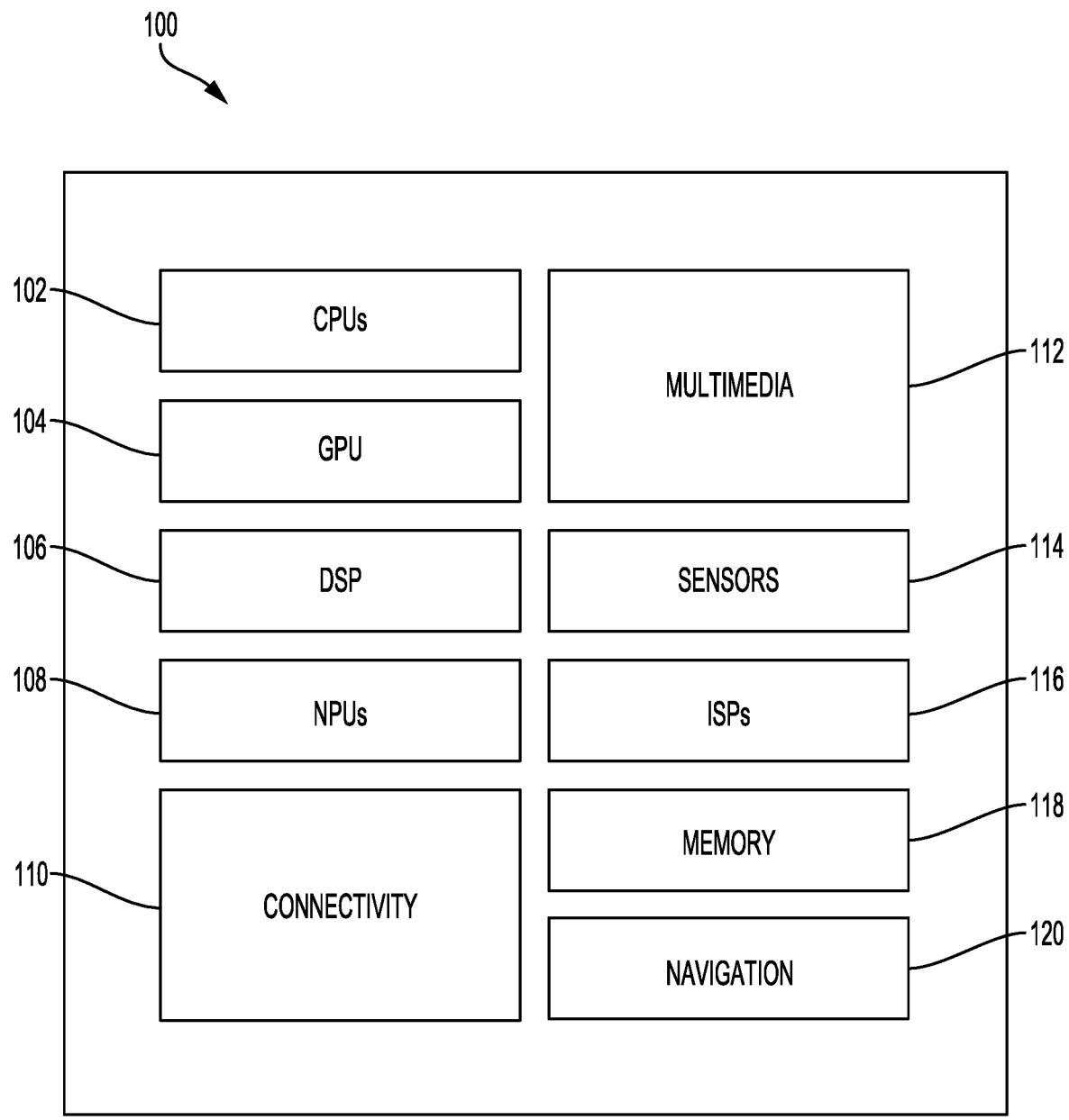
FIG. 1 illustrates an example implementation of designing a neural network using a system-on-a-chip (SOC), including a general-purpose processor, in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The present disclosure may describe an approach to tracking an object in motion when a camera that captures images showing the object is also in motion. In various aspects, a visual tracker may track an object by identifying the object in a frame, and the visual tracker by identify the object in the frame within a search region. The search region may be provided by a motion modeling system that independently models the motion of the object and models the motion of the camera. For example, an object motion model of the motion modeling system may first model the motion of the object, assuming the camera is not in motion, in order to identify the expected position of the object. A camera motion model of the motion modeling system may then update the expected position of the object, obtained from the object motion model, based on the motion of the camera.

FIG. 1 illustrates an example implementation of the aforementioned motion modeling system using a system-on-a-chip (SOC) 100, which may include a general-purpose processor (CPU) or multi-core general-purpose processors (CPUs) 102 in accordance with certain aspects of the present disclosure. Each of the illustrated components of the SOC 100 may be communicatively coupled with one or more of the other components, e.g., via a bus or other interconnect.

Variables (e.g., neural signals and synaptic weights), system parameters associated with a computational device (e.g., neural network with weights), delays, frequency bin information, and task information may be stored in a memory block associated with one or more Neural Processing Units (NPUs) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, process audio and/or visual output. In one implementation, the NPU is implemented in the CPU, DSP, and/or GPU. The SOC 100 may also include a sensor processor 114, image signal processors (ISPs), and/or navigation component 120, which may include a global positioning system.

Figure 2:
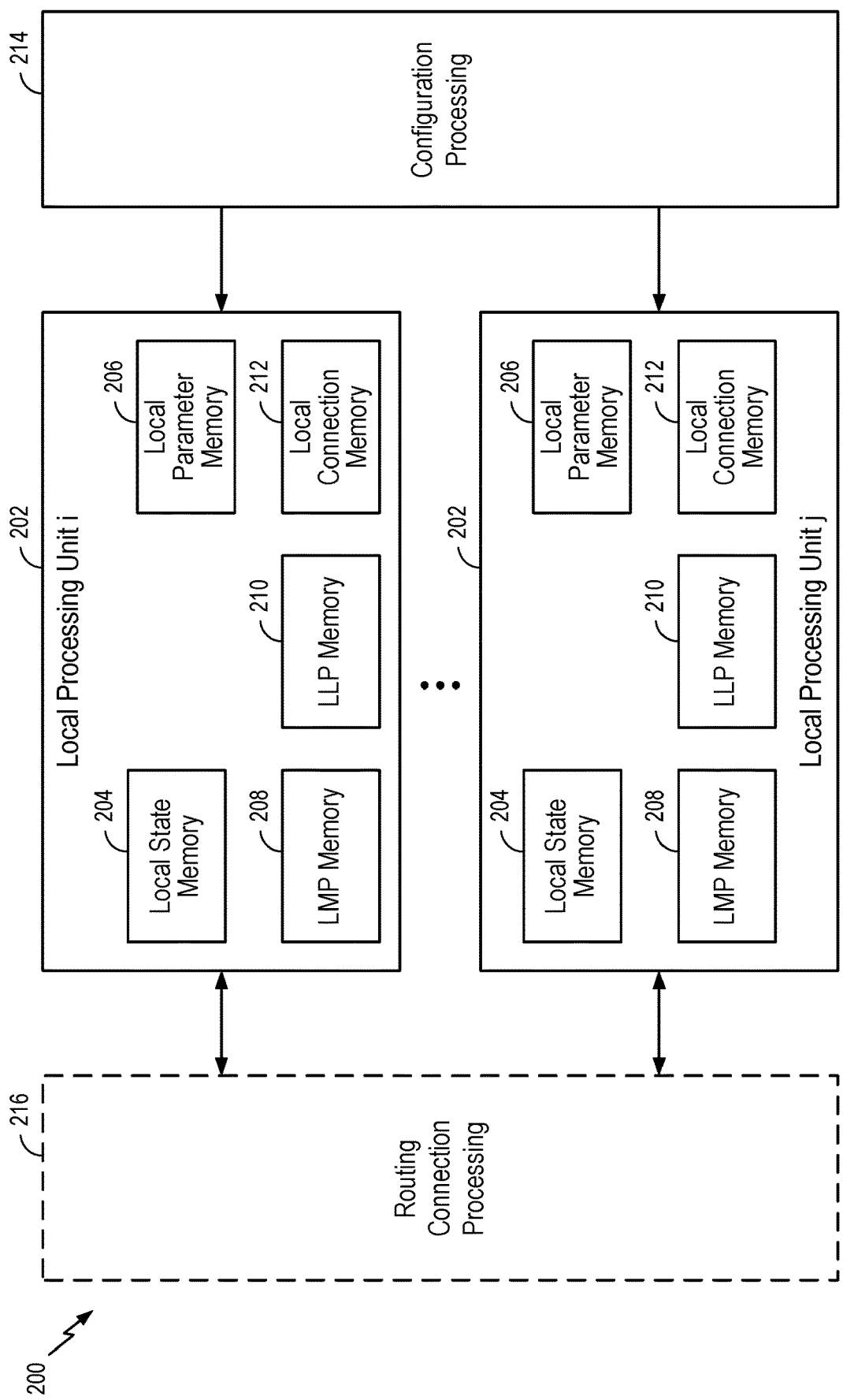
FIG. 2 illustrates an example implementation of a system, in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may include a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Referring to FIG. 3A-D, the connections between layers of a neural network may be fully connected 302 or locally connected 304. In a fully connected network 302 of FIG. 3A, a neuron in a first layer may communicate its output to every neuron in a second layer, so that each neuron in the second layer will receive input from every neuron in the first layer. Alternatively, in a locally connected network 304 of FIG. 3B, a neuron in a first layer may be connected to a limited number of neurons in the second layer. A convolutional network 306 of FIG. 3C may be locally connected, and is further configured such that the connection strengths associated with the inputs for each neuron in the second layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Figures 3A, 3B, 3C:
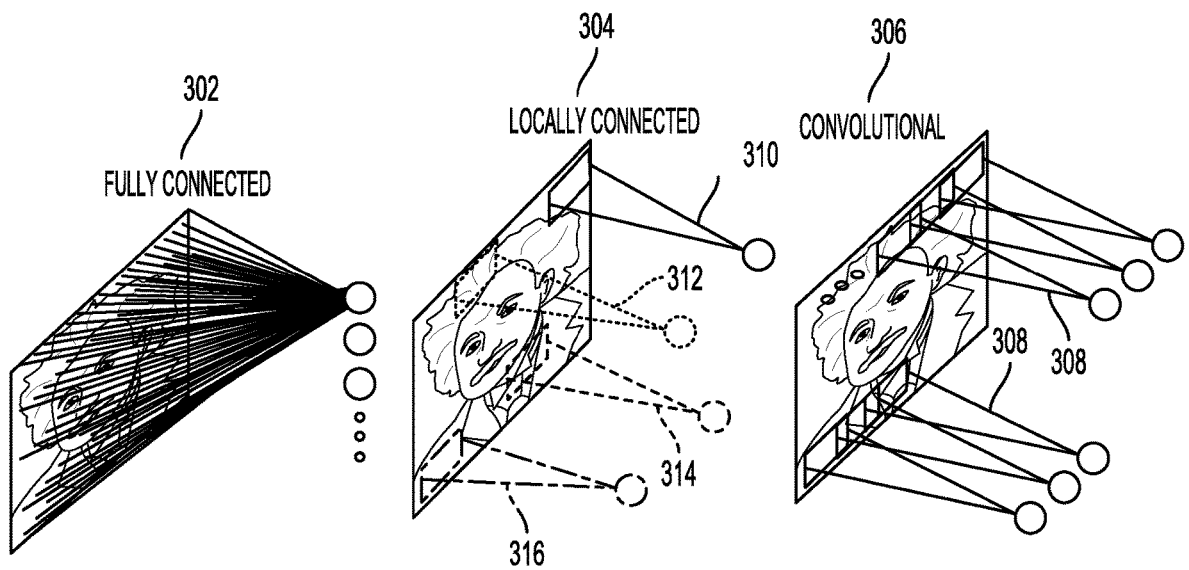
FIGS. 3A-D are diagrams illustrating a neural network, in accordance with aspects of the present disclosure.
Figure 3D:
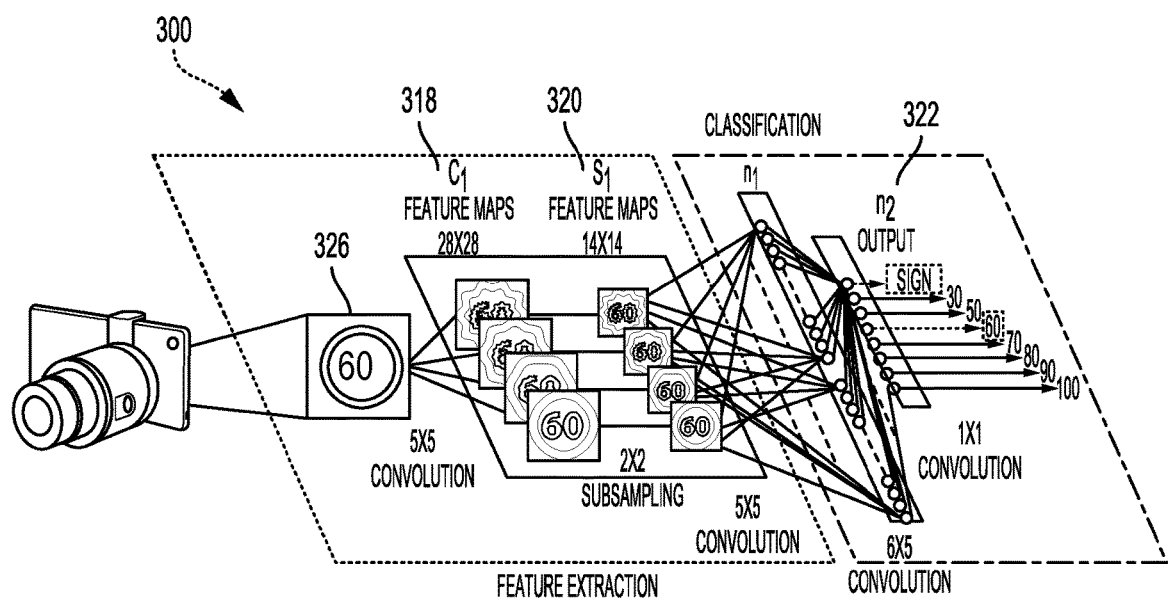

Locally connected neural networks may be well suited to problems in which the spatial location of inputs is meaningful. Referring to FIG. 3D, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like. For example, an image may be filtered by one or more convolutional kernels of a suitable dimension for the image (e.g., 5×5), which may result in one or more feature maps. Feature maps may be subsampled with a commensurate kernel size (e.g., 2×2) in order to determine values for the one or more feature maps. Another iteration may be performed in which the subsampled images are filtered with convolutional kernels (e.g., 5×5), and then again subsampled for local invariance and dimensionality reduction.

A deep convolutional network (DCN) may be a network of convolutional network(s), configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that includes recurrent or feedback connections.

A DCN may be trained with supervised learning. During training, a DCN may be presented with an image, such as a cropped image of a speed limit sign 326, and a "forward pass" may then be computed to produce an output 322. The output 322 may be a vector of values corresponding to features such as "sign" and "60". The network designer may want the DCN to output a high score for some of the neurons in the output feature vector (e.g., a score may be a value indicating the certainty with which a feature map is classified, with higher scores corresponding to higher certainty and lower scores corresponding to lower certainty). For example the one scores corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318 and 320, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks (DNNs) are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3E:
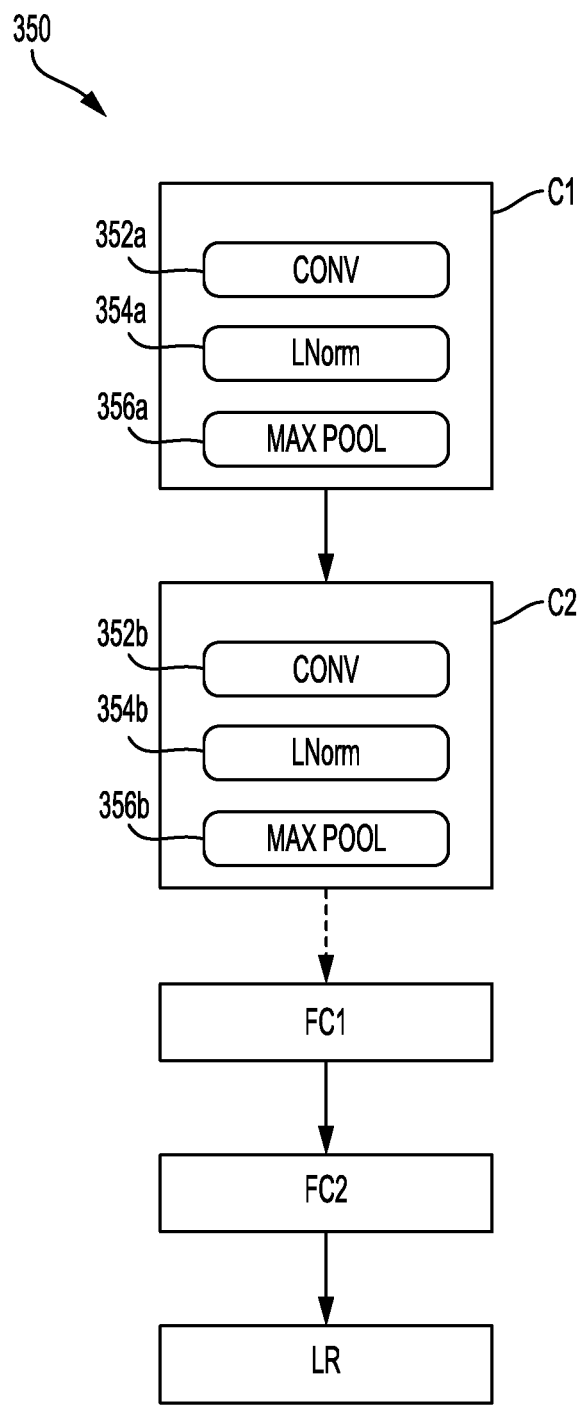
FIG. 3E is a block diagram illustrating an exemplary deep convolutional network (DCN), in accordance with aspects of the present disclosure.

FIG. 3E is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer 352a-b, a normalization layer (LNorm) 354a-b, and a pooling layer 346a-b. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. The normalization layer 354a-b may be used to normalize the output of the convolution filters from convolutional layer 352a-b. For example, the normalization layer 354a-b may provide whitening or lateral inhibition. The pooling layer 356a-b may provide down sampling aggregation over space for local invariance and dimensionality reduction.

The parallel filter banks, for example, of a deep convolutional network may be loaded on a CPU 102 or GPU 104 of an SOC 100, to achieve high performance and low power consumption. In alternative embodiments, the parallel filter banks may be loaded on the DSP 106 or an ISP 116 of an SOC 100. In addition, the DCN may access other processing blocks that may be present on the SOC 100, such as processing blocks 114 and 120, dedicated, respectively, to sensors and navigation.

The deep convolutional network 350 may also include one or more fully connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

Figure 4:
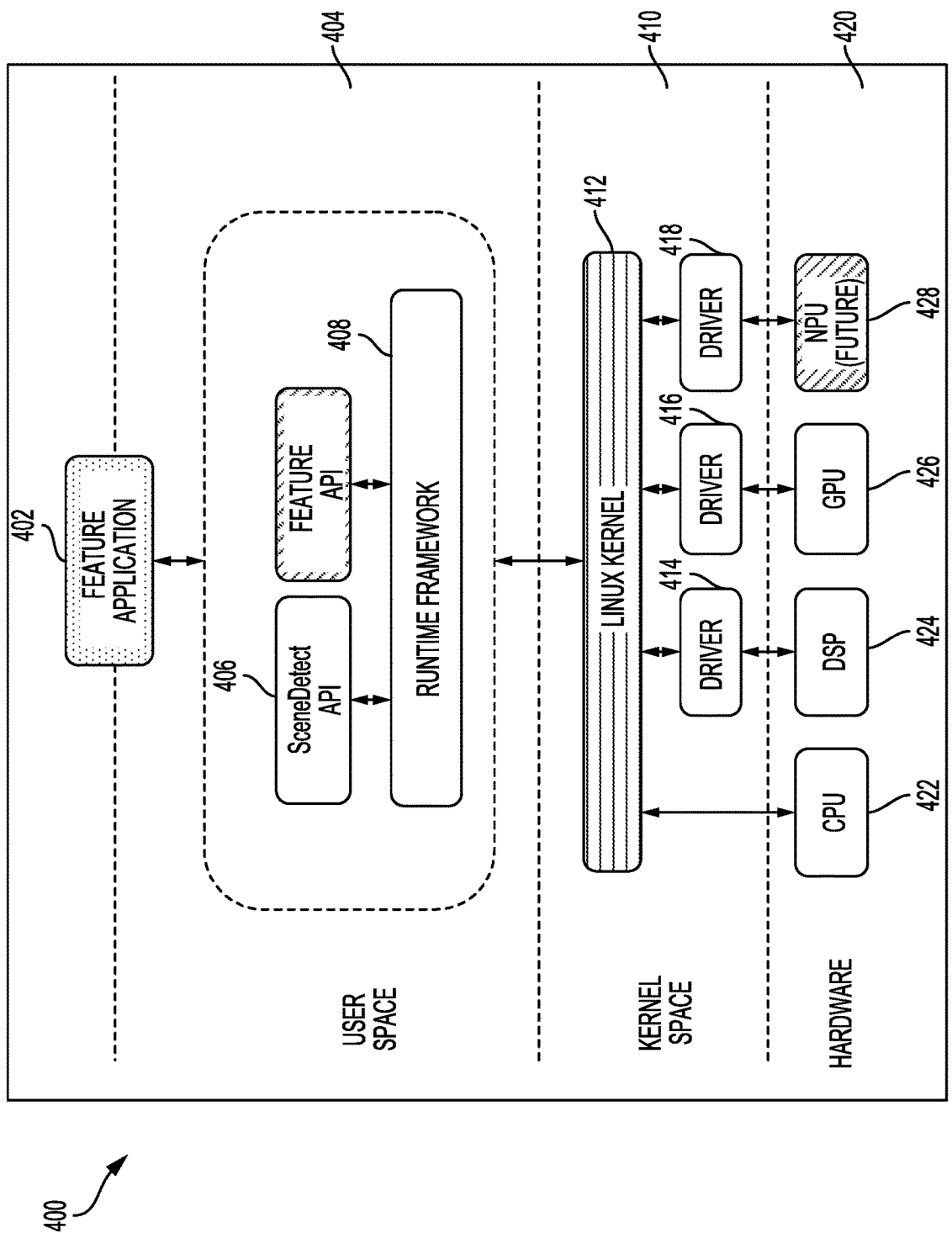
FIG. 4 is a block diagram illustrating an exemplary software architecture that may modularize artificial intelligence (AI) functions, in accordance with aspects of the present disclosure.

FIG. 4 is a block diagram illustrating an exemplary software architecture 400 that may modularize artificial intelligence (AI) functions. Using the architecture, applications 402 may be designed that may cause various processing blocks of an SOC 420 (for example a CPU 422, a DSP 424, a GPU 426 and/or an NPU 428) to perform supporting computations during run-time operation of the application 402.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in an application programming interface (API) 406 to provide an estimate of the current scene. This request may ultimately rely on the output of a deep neural network configured to provide scene estimates based on video and positioning data, for example.

A run-time engine 408, which may be compiled code of a Runtime Framework, may be further accessible to the AI application 402. The AI application 402 may cause the run-time engine, for example, to request a scene estimate at a particular time interval or triggered by an event detected by the user interface of the application. When caused to estimate the scene, the run-time engine may in turn send a signal to an operating system 410, such as a Linux Kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for a DSP 424, for a GPU 426, or for an NPU 428. In the exemplary example, the deep neural network may be configured to run on a combination of processing blocks, such as a CPU 422 and a GPU 426, or may be run on an NPU 428, if present.

Figure 5:
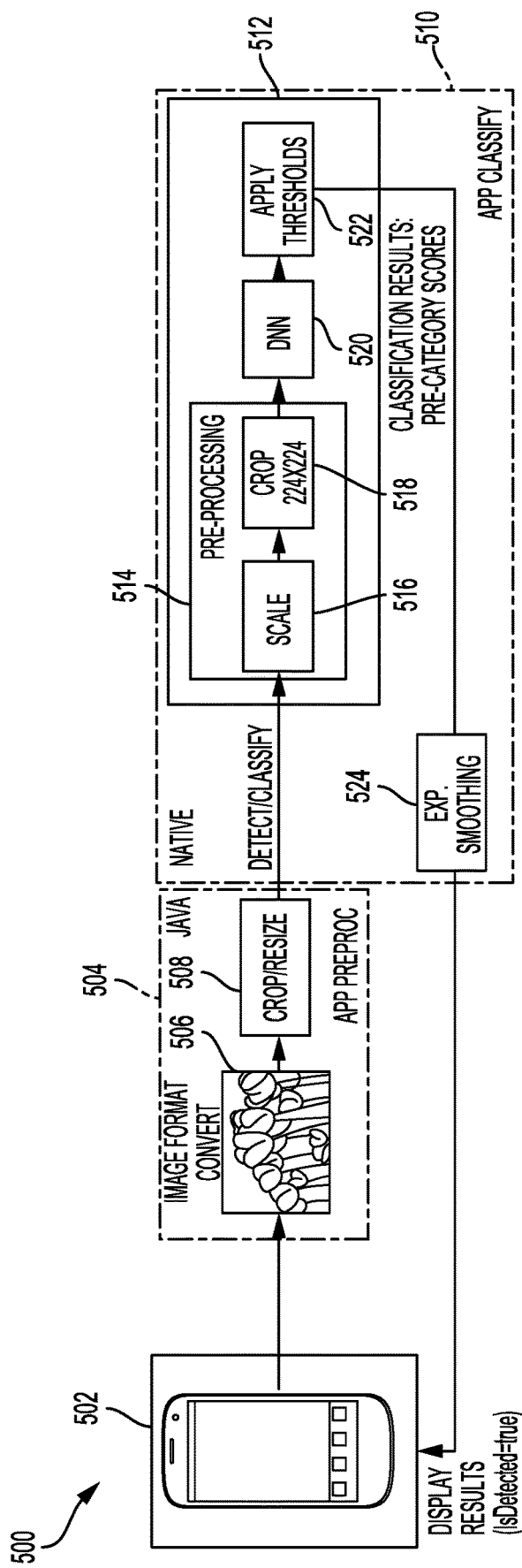
FIG. 5 is a block diagram illustrating the run-time operation of an AI application on a smartphone, in accordance with aspects of the present disclosure.

FIG. 5 is a block diagram illustrating the run-time operation 500 of an AI application on a smartphone 502. The AI application may include a pre-process unit 504 that may be configured (using for example, the JAVA programming language) to convert the format of an image 506 and then crop and/or resize the image 508. The pre-processed image may then be communicated to a classify application 510 that contains a SceneDetect Backend Engine 512 that may be configured (using for example, the C programming language) to detect and classify scenes based on visual input. The SceneDetect Backend Engine 512 may be configured to further preprocess 514 the image by scaling 516 and cropping 518. For example, the image may be scaled and cropped so that the resulting image is 224 pixels by 224 pixels. These dimensions may map to the input dimensions of a neural network. The neural network may be configured by a deep neural network block 520 to cause various processing blocks of the SOC 100 to further process the image pixels with a deep neural network. The results of the deep neural network may then be thresholded 522 and passed through an exponential smoothing block 524 in the classify application 510. The smoothed results may then cause a change of the settings and/or the display of the smartphone 502.

With reference to FIGS. 6-12, various aspects of an object-tracking system may be described. In aspects, an object-tracking system may include and/or may be communicatively coupled with at least one camera. However, the at least one camera may not be stationary. For example, the camera may be incorporated in systems and apparatuses that are mobile, causing the motion of an object relative to the camera to be a function of both the object's motion and the camera's motion. Examples of systems and apparatuses that may include object-tracking systems include automobiles (e.g., for autonomous driving), drones (e.g., for avoidance of moving or dynamic obstacles, Internet-enabled cameras and/or other Internet-of-Things (IoT) devices, service robots, and so forth.

Because the motion of an object relative to the camera may be a function of both the object's motion and the camera's motion, modeling an object's motion (e.g., to define a search region) may take into account both the object's motion and the camera's motion. For example, modeling an object's motion may define a search region that may be provided to a visual tracker that is configured to identify the object and/or the object's position in a frame. In various aspects, modeling of the object's motion and modeling of the camera's motion may be separately performed. For example, an object motion model may be decoupled from a camera motion model. Accordingly, the object motion model may estimate a search region based on the object's motion, without considering the motion of the camera, and the camera motion model may update the search region based on the camera's motion. This search region may be provided to a visual tracker (e.g., object-tracking system) in order to identify the object and/or the object's position. Some examples of systems and apparatuses that may be capable of identifying and/or tracking an object may be illustrated by FIGS. 3A, 3B, 4, and 5, supra.

Figure 6:
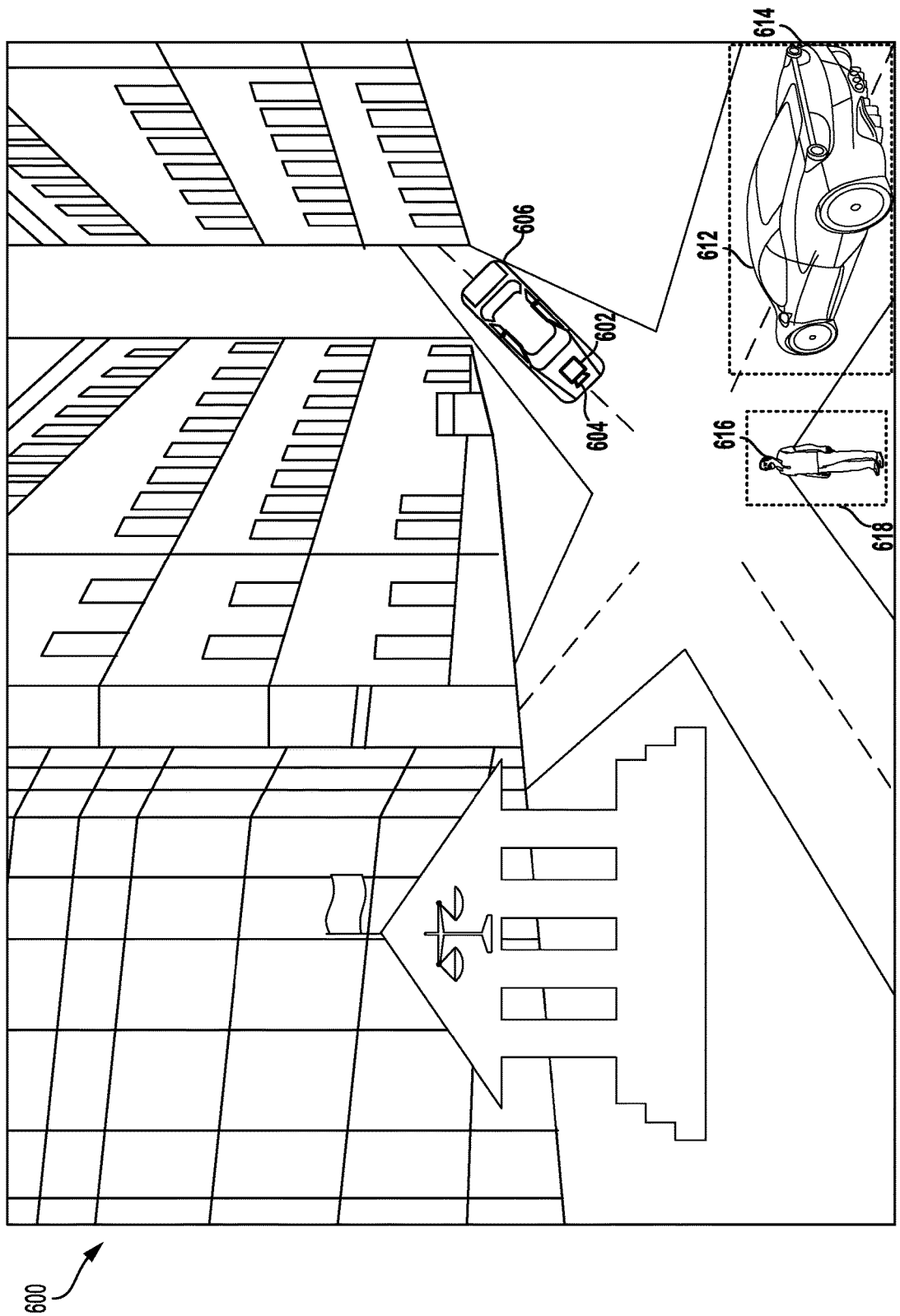
FIG. 6 is a block diagram illustrating an environment in which an object-tracking system may track objects, in accordance with certain aspects of the present disclosure.

FIG. 6 is a block diagram illustrating an environment 600 in which an object-tracking system 602 may track one or more objects 612, 616. In the environment 600, the object-tracking system 602 is included in a car 606. However, aspects described herein with reference to an object-tracking system (e.g., the object-tracking system 602) may be applicable to essentially any other system in which a camera may be in motion while an object is to be tracked.

According to various aspects, the object-tracking system 602 may include and/or may be communicatively coupled with a camera 604 (or another image-capture device having an image sensor). The camera 604 may be configured to capture image data (e.g., video, still frame(s), etc.) representing a portion of the environment 600 that is within a field of view of the camera 604. As the car 606 travels along a roadway, the camera 604 may capture image data representing a portion of the environment 600. For example, the camera 604 may capture image data that includes at least a portion of the objects 612, 616 (e.g., the other car 612 and/or the person 616).

The camera 604 may provide the image data to the object-tracking system 602, which may separately model the motion of one or more objects 612, 616 and the motion of the camera 604. For example, the object-tracking system 602 may first model the motion of the one or more objects 612, 616 in order to estimate one or more search regions in which the one or more objects 612, 616 are estimated to be positioned, and then the object-tracking system may model the motion of the camera 604 in order to update the one or more search regions in which the one or more objects 612, 616 are estimated to be positioned.

By way of illustration, the person 616 may be in motion toward a roadway on which the car 606 is traveling. Accordingly, the position of the person 616 relative to the camera 604 may be a function of both the motion of the person 616 and the motion of the car 606 (to which the camera 604 is attached). In order to estimate the position of the person in a next frame of the image data, the object-tracking system 602 may consider both the motion of the person 616 and the motion of the car 606.

In various aspects, the object-tracking system 602 may obtain the image data from the camera 604. The image data may include a plurality of frames (e.g., the image data may be video or a plurality of still images) that depict at least a portion of the person 616. The object-tracking system 602 may determine position information associated with the person 616 based on the image data. For example, the object-tracking system 602 may model the estimated position of the person 616 in a next frame of the plurality of frames based on one or more of the previous frames of the plurality of frames. In aspects, the object-tracking system 602 may first estimate the position of the person 616 without considering the motion of the camera 604. In other words, the object-tracking system 602 may assume that the camera 604 is stationary when first estimating the position of the person 616.

After first determining the position information of the person 616 based on an absence of the motion of the camera 604, the object-tracking system 602 may then update the position information by modeling the motion of the camera 604. For example, the object-tracking system 602 may adjust the position information to reflect the position of the person 616 relative to the car 606 after estimating the position of the person 616 based on the motion of the person 616. Accordingly, the object-tracking system 602 may predict a search region 618 in which the person 616 is estimated to be positioned. The search region 618 may be a search region in a next frame that is used by the object-tracking system 602 to identify the position of the person 616 in the next frame.

The object-tracking system 602 may be configured to track a plurality of objects that are within a field of view of the camera 604. For example, the object-tracking system 602 may contemporaneously identify a search region 614 in which the car 612 is estimated to be positioned and a search region 618 in which the person 616 is estimated to be positioned.

Figure 7:
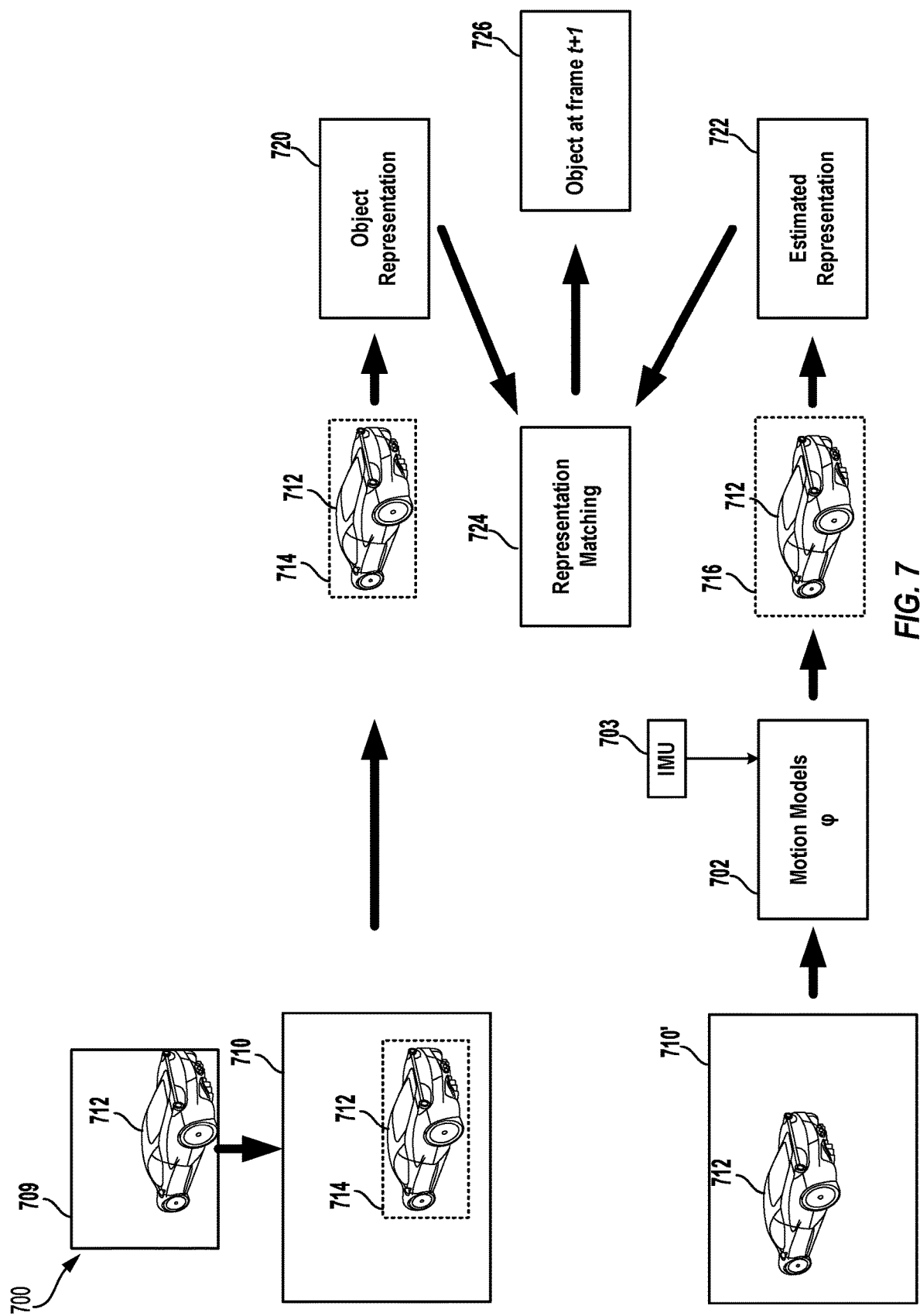
FIG. 7 is a block diagram illustrating an object-tracking system, in accordance with certain aspects of the present disclosure.

FIG. 7 illustrates a block diagram of an architecture 700 for tracking an object, in accordance with various aspects. Various aspects of FIG. 7 may be described with reference to FIG. 6. For example, the object-tracking system 602 may implement the architecture 700.

The camera 604 may capture image data that represents a portion of the environment 600 over a plurality of time steps. In aspects, each time step may be represented in a frame of the image data. For example, the image data may include a frame 710 at time t and a frame 710' at time t+1.

For the frame 710 at time t, the object-tracking system 602 may identify a bounding box 714 that represents a portion of the frame 710 in which at least a portion of the object 712 is located. In some aspects, the object-tracking system may identify the bounding box 714 based on previous motion modeling at previous time steps. For example, a frame 709 at time t−1 may be used to model the motion of the object 712 and the motion of the camera 604. Accordingly, the object-tracking system 602 may identify the bounding box 714 for frame 710 at time t. Operations for identifying the bounding box 714 in the frame 710 at time t may be similar to the identification 724 of the object 712 in the frame 710' at time t+1, as described infra (e.g., the bounding box 714 may be derived as a portion of the frame 710 at time t in which the object 712 has been previously detected).

From the bounding box 714, the object-tracking system 602 may generate an object representation 720 that represents the object 712 in the frame 710 at time t. Examples of an object representation 720 may include a color histogram representing the object 712 in the bounding box 714, a sparse coding pattern representing the object 712 in the bounding box 714, a scalar-invariant feature transform (SIFT) representing the object 712 in the bounding box 714, a set of extracted features representing the object 712 in the bounding box 714, or another representation of the object 712 in the bounding box 714. In some aspects, the object-tracking system 602 may generate the object representation 720 using a neural network or other machine-learning model, such as a CNN.

For the frame 710' at time t+1, the object-tracking system 602 may model the motion of the object 712 and, separately, model the motion of the camera 604 in order to determine the search region 716 at time t+1. In one aspect, the object-tracking system 602 may include a set of motion models 702, e.g., a first motion model that is to model the motion of the object 712, and a second motion model that is to model the motion of the camera 604. In one aspect, the set of motion models 702 may be implemented in sequence, e.g., the first motion model may first model the motion of the object 712, and then the second motion model may model the motion of the camera 604. Aspects of the motion models 702 may be described, infra, with respect to FIGS. 8-10.

In one aspect, the first motion model of the motion models 702 may model the motion of the object 712. For example, the first motion model may obtain the position of the object 712 at time t, e.g., consistent with the bounding box 714 at time t in the frame 710. In some aspects, the first motion model may model the motion of the object 712 based on a velocity or acceleration of the object 712. In some aspects, the first motion model may estimate the velocity and/or acceleration based on past observations (e.g., the position(s) of the object 712 in each frame of a set of frames, including the frame 710 at time t). In some aspects, the first motion model may assume the velocity and/or acceleration are constant.

The first motion model may model the motion of the object 712 based on an absence of motion by the camera 604. In other words, the first motion model may assume that the camera 604 is fixed, and may refrain from accounting for the motion of the camera 604 in modeling the motion of the object 712.

The first motion model may determine position information associated with the object 712. In some aspects, the position information may indicate a search region (e.g., a portion of the frame 710' at time t+1) in which at least a portion of the object 712 is estimated to be positioned.

The first motion model may provide the position information to the second motion model of the motion models 702. The second motion model may model the motion of the camera 604. In one aspect, the second motion model may model the motion of the camera 604 using visual odometry. For example, the second motion model may estimate homography between the frame 710 at time t and the frame 710' at time t+1. In some aspects, the second motion model may model the motion of the camera 604 based on random sample consensus (RANSAC) for visual odometry and/or least median squares (LMedS) for visual odometry. In some aspects, the second motion model may model the motion of the camera 604 based on point correspondence from matching key points across the frame 710 at time t and the frame 710' at time t+1.

In another aspect, the second motion model may model the motion of the camera 604 using inertial odometry. For example, the second motion model may obtain output from an inertial measurement unit (IMU) 703 that measures motion (e.g., acceleration, velocity, rotation, etc.) of the camera 604. From the IMU 703 measurements, the second motion model may obtain the motion of the camera 604 in three-dimensional (3D) coordinate space. The second motion model may model the effect of the motion of the camera on the position information (e.g., a search region) obtained from the first motion model in order to adjust the position information to account for the motion of the camera 604. The second motion model may translate the position information, modeled with the 3D motion of the camera 604, a two-dimensional (2D) coordinate space that is consistent with the frame 710' at time t+1.

The second motion model may output the position information that indicates the estimated position of at least a portion of the object 712 in the frame 710' at time t+1. This position information may be position information adjusted from the first motion model. In effect, the first motion model may determine position information associated with the object 712 based on the motion of the object 712 but without considering the motion of the camera 604, whereas the second motion model may determine position information associated with the object 712 without considering the motion of the object 712 but while considering motion of the camera 604. In various aspects, the position information may include a search region 716 at time t+1, which may be a portion of the frame 710' at time t+1 in which at least a portion of the object 712 is estimated to be positioned.

From the search region 716 at time t+1, the object-tracking system 602 may generate an estimated representation 722 that represents the object 712 in the frame 710' at time t+1. Examples of an estimated representation 722 may include a color histogram representing the object 712 in the search region 716, a sparse coding pattern representing the object 712 in the search region 716, a scalar-invariant feature transform (SIFT) representing the object 712 in the search region 716, a set of extracted features representing the object 712 in the search region 716, or another representation of the object 712 in the search region 716. In some aspects, the object-tracking system 602 may generate the estimated representation 722 using a neural network or other machine-learning model, such as a CNN.

Having both the object representation 720 and the estimated representation 722, the object-tracking system 602 may perform representation matching 724, e.g., in order to determine whether the object 712 in the frame 710 at time t corresponds with (e.g., matches) the object 712 in the frame 710' at time t+1. In one aspect, representation matching 724 may include cross-correlation in order to measure the similarities between the object representation 720 and the estimated representation 722. In one aspect, representation matching 724 may include a SVM, which may be trained online (e.g., as representations of objects become available). In one aspect, representation matching 724 may include a CNN (e.g., a CNN that is fine-tuned for matching one representation to another representation).

When the representation matching 724 indicates that the object representation 720 corresponds with the estimated representation 722, the object-tracking system 602 may obtain identification 726 of the object 712 in the frame 710' at the time t+1. With the identification 726 of the object 712 in the frame 710' at the time t+1, the object-tracking system 602 may perform various operations and/or output information associated with the identification 726 of the object 712 in the frame 710' at the time t+1 in order for another system or apparatus to perform various operations, such as an audio system to alert the user or an autonomous driving system to change the course to avoid the object 712. For example, with autonomous driving, the car 606 may yield to the object 712 (e.g., other car) when the car 606 is traveling along a roadway.

Figure 8:
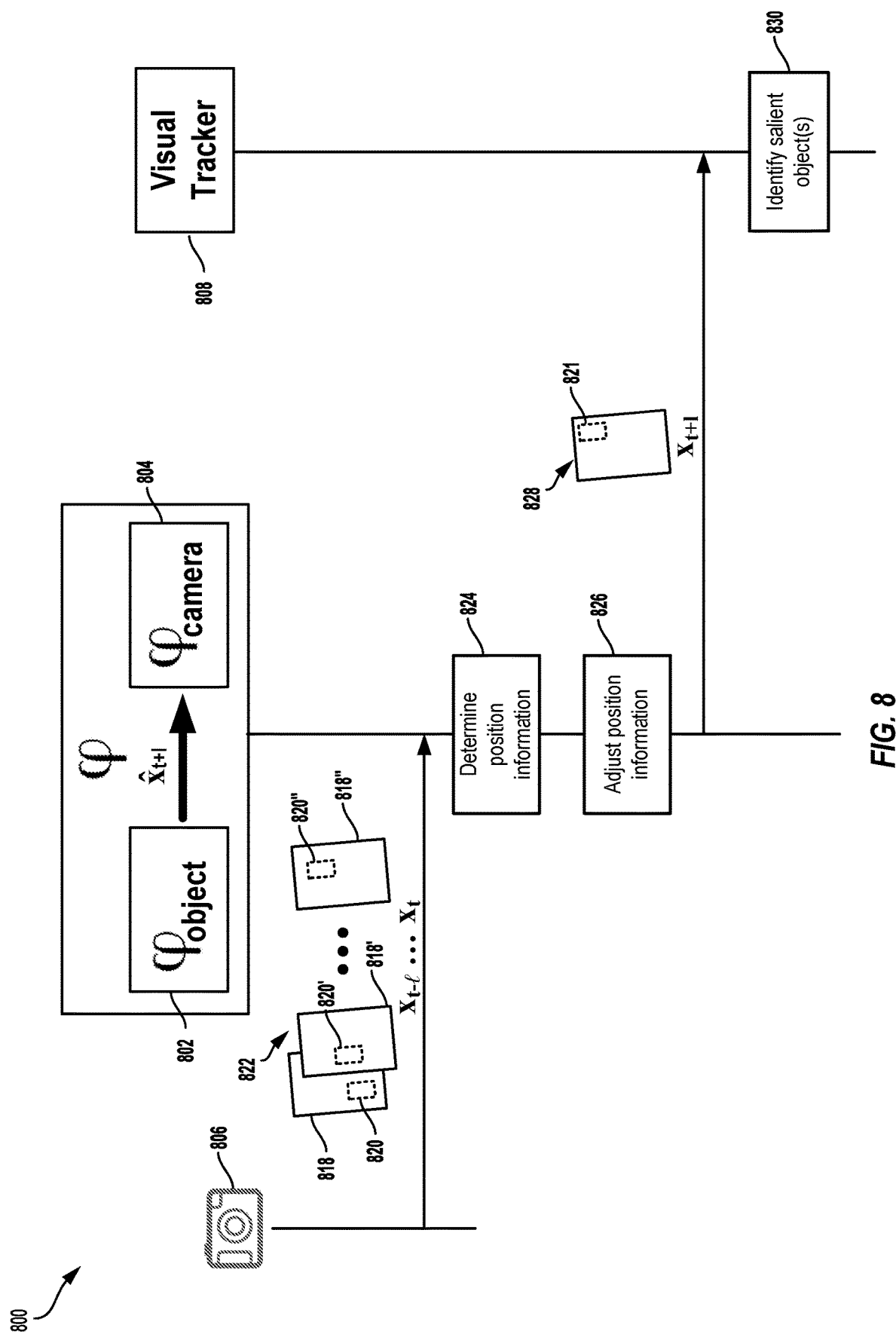
FIG. 8 is a block diagram illustrating a call flow diagram of tracking an object, in accordance with certain aspects of the present disclosure.

With reference to FIG. 8, a call flow diagram illustrates a method 800 of tracking an object, in accordance with various aspects of the present disclosure. FIG. 8 illustrates a camera 806. In aspects, the camera 806 may be any device that includes an image sensor configured to capture image data, such as a video camera, a camera configured to capture a set of still images, etc. In various aspects, the camera 806 may be in motion. For example, the camera 806 may be affixed to a vehicle or drone. Therefore, the position of an object in frames captured by the camera 806 may be affected by the motion of the camera 806. In the context of FIG. 6, the camera 806 may be an aspect of the camera 604. In the context of FIG. 7, the camera 806 may be configured to capture the frame 710 at time t and the frame 710' at time t+1.

The camera 806 may be configured to capture image data 822. In one aspect, the image data 822 may include video, which may be divisible into frames 818, 818', 818" that each represent the field of view of the camera 806 at a respective time step from time t-f to time t (t being a respective time step and t being an interval in time). In another aspect, the image data 822 may include a plurality of still images, illustrated as frames 818, 818', 818".

In each of the still frames 818, 818', 818", an object may be positioned in a respective bounding box 820, 820', 820". Each bounding box 820, 820', 820" may be a 2D box, which may be represented as 2D coordinates corresponding to a respective frame 818, 818', 818": a horizontal coordinate (x) in the frame (e.g., a horizontal coordinate of the top left corner of a box), a vertical coordinate (y) in the frame (e.g., a vertical coordinate of the top left corner of a box, a width (w) of the box, and a height (h) of the box. That is, the position $x_i$ of an object at a specific time i may be represented as coordinates [x, y, w, h], such that $x_i \in R^4$.

FIG. 8 further illustrates a visual tracker 808. The visual tracker 808 may be configured to identify or detect one or more objects in image data. For example, the visual tracker 808 may be configured to identify or detect a position of an object over a plurality of still frames. In particular, the visual tracker 808 may be configured to "track" a position of an object when the position of the object is different in each frame of a plurality of frames. In some aspects, the visual tracker 808 may include a CNN that is trained to determine correspondence (e.g., matching) of the object in one frame to the object in a next frame when the position of the object changes from the one frame to the next frame. In the context of FIG. 6, the visual tracker 808 may be included in and/or may be communicatively coupled with the object-tracking system 602. In the context of FIG. 7, the visual tracker 808 may be configured to determine (e.g., generate) the object representation 720 from the frame 710 at time t and, further, may be configured to determine (e.g., generate) the estimated representation 722 from the frame 710' at time t+1 based on the search region 716. In addition, the visual tracker 808 may be configured for the representation matching 724 in order to determine whether the object representation 720 corresponds with the estimated representation 722 so that the visual tracker 808 may obtain the identification 726 of the object 712 in the frame 710' at the time t+1 for tracking the object 712.

FIG. 8 further illustrates two motion models: an object motion model 802 and a camera motion model 804. In the context of FIG. 6, the motion models 802, 804 may be included in and/or may be communicatively coupled with the object-tracking system 602. In the context of FIG. 7, the motion models 802, 804 may be an aspect of the motion models 702.

The object motion model 802 may be configured to model the motion of an object in order to estimate the position of an object in a frame, assuming the camera 806 is fixed. Specifically, the object motion model 802 may determine position information (e.g., a search region) associated with an object that may be a prediction of the position of the object in a frame at time t+1 based on the observed position of the object in one or more previous frames (e.g., a frame at time t, a frame at time t−1, etc.). For example, the object motion model 802 may be a function $\varphi_{object}$, which estimates the position of an object in a frame at time t+1 (e.g., $\hat{x}_{t+1}$) based on the position $\hat{x}$ of the object over a set of preceding time steps from time t−l to time t (e.g., where l indicates a length of time, such as a number of time steps, before time t), independent of camera movement. That is, $\hat{x}_{t+1} = \varphi_{object}(x_t, \ldots, x_{t-l})$.

In various aspects, the object motion model 802 may be a RNN and/or machine-learning model. For example, the object motion model 802 may include a long short-term memory (LSTM) network. In some aspects, the object motion model 802 may model the motion of an object in a frame using one or more filters, including Bayesian filters, Kalman filters, and/or particle filters.

The camera motion model 804 may be configured to model the motion of the camera 806 in order to estimate the position of the object in the frame, independent of the motion of the object. Specifically, the camera motion model 804 may update the position information (e.g., the search region) associated with an object at time t+1, modeled by the object motion model 802, based on the motion of the camera 806 from at least time t to time t+1. For example, the camera motion model 804 may be a function $\varphi_{camera}$, which estimates the position of an object in a frame at time t+1 (e.g., $x_{t+1}$) based on the position x of the object over a set of preceding time steps from time t−l to time t (e.g., where I, indicates a length of time, such as a number of time steps, before time t), with the motion of the object having been already modeled by $\varphi_{object}$. That is, $x_{t+1} = \varphi_{camera}(\hat{x}_{t+1})$.

In one aspect, the camera motion model 804 may model the motion of the camera 806 based on at least one of a rotation matrix R and/or a translation matrix T of the camera, which may define how the camera 806 moves in 3D space. For example, $\varphi_{camera} = [R_{t,t+1} | T_{t,t+1}]$, where R is the rotation matrix of the camera 806 and T is the translation matrix of the camera 806. In some aspects, the camera motion model 804 may be simplified by modeling the rotation of the camera 806 without modeling the translation. In aspects, the camera motion model 804 may model the motion of the camera 806 using visual odometry (e.g., using images captured by the camera 806), using inertial odometry (e.g., using an IMU that captures motion of the camera 806), and/or a combination of visual and inertial odometry.

The motion models 802, 804 may obtain the image data 822 from the camera 806. With the image data 822, the motion models 802, 804 may model the motion of an object in the bounding box 820 across a plurality of frames. While FIG. 8 describes motion of the object modeled before motion of the camera, the present disclosure comprehends aspects in which the motion of the camera is modeled before the motion of the object.

From the obtained image data 822, the object motion model 802 may determine 824 an expected position 821 of the object at a future time step. In some aspects, the expected position 821 of the object at the future time step may include a search region (e.g., a set of coordinates). In various aspects, the object motion model 802 may determine 824 the expected position 821 of the object based on the position of the bounding boxes 820, 820', 820" over the frames 818, 818', 818" at each of the previous time steps from t to t−l.

In one aspect, the object motion model 802 may determine 824 the expected position 821 using one or more Bayesian filters, such as one or more Kalman filters and/or one or more particle filters. For example, the object motion model 802 may model the motion of the object in the bounding box 820 based on at least one of a constant velocity or a constant acceleration associated with the object over the set of previous time steps t to t−1. Some examples include at least one Kalman filter with constant velocity, at least one Kalman filter with constant acceleration, and/or at least one Kalman filter on 3D locations (e.g., from stereo).

In some aspects, the object motion model 802 may estimate one or more variables (e.g., hidden variables) of the aforementioned filters may be estimated based on observations (e.g., positions) associated with the each bounding box 820, 820', 820" over each frame 818, 818', 818". For example, velocity of the object may be based on the change of position between the bounding box 820' and 820" over the time step(s) between the frames 818' and 818". Similarly, acceleration of the object may be based on the rate of change of position between the bounding boxes 820, 820', and 820" over the time steps between frames 818, 818', and 818". Illustratively, the expected position 821 of the object in the frame 828 at time t+1 may be given by $$x_{t+1} = x_t + x_t dt + \frac{1}{2} a dt^2,$$

where $x_i$ may be the position of the object at time i, $x_t$ dt may be the velocity of the object at time t, and $$\frac{1}{2} a dt^2$$

may be the acceleration at time t.

In some aspects, the object motion model 802 may include a RNN (e.g., LSTM network). The RNN may be trained on one or more bounding boxes in frames that are ground truths (e.g., known object location at time i). Therefore, the RNN may be trained on motion of an object that the RNN is to identify, because such information may be explicitly provided to the RNN (e.g., as ground truth, instead of observation). Some examples of RNNs include a step-LSTM network (e.g., one layer of 512 LSTM units) and/or a LSTM network.

The object motion model 802 may determine 824 the expected position 821 of the object based on absence of motion by the camera 806 over the previous time steps t to t−1. That is, the object motion model 802 may determine 824 the expected position 821 based on an assumption that the camera 806 is fixed, and motion of the camera 806 does not affect the position of the object relative to the camera 806.

The object motion model 802 may provide the expected position of the object to the camera motion model 804. In one aspect, the object motion model 802 may provide expected position of the object as a set of coordinates (e.g., [x, y, w, h]). The camera motion model 804 may obtain the expected position of the object.

Because the camera 806 moves independently from the object, the position of the object relative to the camera 806 may be affected by the motion of the camera 806. Therefore, the camera motion model 804 may adjust 826 the expected position 821 of the object based on the motion of the camera 806. For example, the camera motion model 804 may model the motion of the camera 806 over the set of previous time steps from t to t−1.

In one aspect, the camera motion model 804 may model the motion of the camera 806 using visual odometry. In one aspect, the camera motion model may model the motion of the camera based on point correspondence. For example, the camera motion model 804 may estimate the homography between frames (e.g., frames 818', 818") in order to determine the rotation and/or translation experienced by the camera between those frames. In one aspect, the camera motion model 804 may identify a plurality of points (e.g., at least five) in the frame 818', and then may identify the set of corresponding points in the frame 818". The camera motion model 804 may measure the difference between each point and each point's corresponding point in order to determine the motion experienced by the camera 806 between the frames 818', 818". In some aspects, the camera motion model 804 may use RANSAC or LMeDS for point correspondence.

In another aspect, the camera motion model 804 may model the motion of the camera 806 using inertial odometry. For example, the camera 806 may be associated with an IMU that indicates motion (e.g., rotation, translation, orientation, acceleration, etc.) experienced by the camera 806. An IMU may include a gyroscope sensor, an accelerometer sensor, a magnetometer sensor, or other similar sensor. The camera motion model 804 may obtain the indication of motion experienced by the camera 806 from the IMU.

The camera motion model 804 may obtain motion measurement(s) from the IMU in 3D coordinate space. For example, the IMU may measure motion of the camera 806 in at least one of the six degrees of freedom (6DoF) (e.g., surge, heave, sway, pitch roll, and/or yaw). Because the expected position 821 may be output to the visual tracker 808 in 2D coordinates (e.g., image coordinates), the camera motion model 804 may translate the measurement(s), obtained from the IMU, from 3D coordinate space to 2D coordinate space.

In one aspect, the camera motion model 804 may compute the 2D coordinates for the expected position 821 by first triangulating the 3D measurements to map the expected position 821 in 3D coordinate space to the 2D coordinate space. In aspects, this computation may be dependent upon the intrinsic matrix K of the camera 806 (e.g., the intrinsic matrix K of the camera 806 may be a projection matrix that maps from 3D points in the real world to 2D points on an image). The position of the object in 2D coordinate space may be proportional to the position of the object in 3D coordinate space based on the intrinsic matrix K—e.g., $x_{t=1}^{2D} \propto K x_{t+1}^{3D}$, where $x_{t+1}^{2D}$ may be the position of the object in 2D coordinate space at time t+1 and $x_{t=1}^{3D}$ may be the position of the object in 3D coordinate space at time t+1.

Still in 3D coordinate space, the camera motion model 804 may map the position of the object in the bounding box 820" in frame 818" at time t to the expected position 821 in the frame 828 at time t+1. The position of the object at time t+1 may be proportional to the model of the motion of the camera 806 at time t: $x_{t+1}^{3D} \propto \varphi_{camera} x_t^{3D}$.

Given the proportionalities $x_{t+1}^{2D} \propto K x_{t+1}^{3D}$ and $x_{t+1}^{3D} \propto \varphi_{camera} x_t^{3D}$, the camera motion model 804 may compute the expected position 821 in 2D coordinate space at time t+1 (i.e., $x_{t+1}^{2D}$) as proportional to the product of the intrinsic matrix and the camera motion model function, given the inverse of the intrinsic matrix, for the position of the object in 2D coordinate space at time t (i.e., $x_t^{2D}$): $x_{t+1}^{2D} \propto K \varphi_{camera} K^{-1} x_t^{2D}$.

The camera motion model 804 may output the expected position 821 of the object in a frame 828 at time t+1 as a set of coordinates. For example, the expected position 821 may be provided as [x, y, w, h]. The camera motion model 804 may provide the expected position 821 to the visual tracker 808.

The visual tracker 808 may identify, based on the expected position 821 of the object at time t+1, the object depicted in the frame 828 at time t+1, e.g., in order to track the object. In one aspect, the visual tracker 808 may generate a representation of the region within the expected position 821. For example, the visual tracker 808 may generate a color histogram representing the expected position 821, a sparse coding pattern representing the expected position 821, a SIFT representing the expected position 821, a set of extracted features representing the expected position 821, or another representation of the expected position 821.

The visual tracker 808 may compare the generated representation to a known representation of the object. The known representation may be a corresponding one of a color histogram representing the bounding box 820" at time t, a sparse coding pattern representing the bounding box 820" at time t, a SIFT representing the bounding box 820" at time t, a set of extracted features representing the bounding box 820" at time t, or another representation of the bounding box 820" at time t.

Based on the comparison, the visual tracker 808 may determine whether the object is within the expected position 821. For example, the visual tracker 808 may cross correlate the representation of the expected position 821 with the bounding box 820" in order to measure the similarities between the two. In one aspect, the visual tracker 808 may include a SVM, which may be trained online (e.g., as representations of objects become available). In one aspect, the visual tracker 808 may include a CNN (e.g., a CNN that is fine-tuned for matching one representation to another representation).

If the object is within the expected position 821, the visual tracker 808 may output information associated with the object. For example, if the object within the expected position 821 is an obstacle, a vehicle may adjust a travel direction to avoid striking the object.

Figure 9:
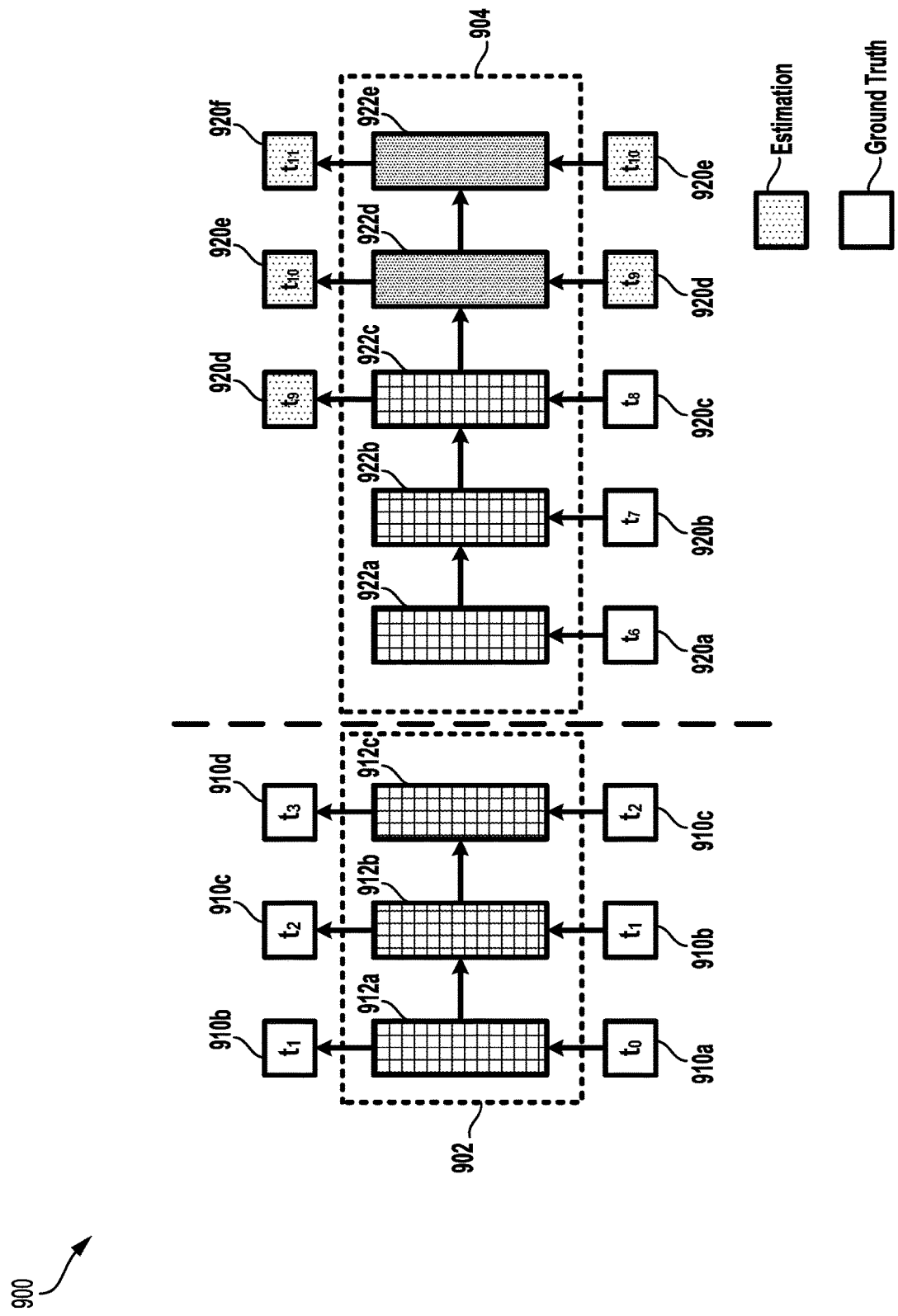
FIG. 9 is a block diagram illustrating a training and prediction by an object motion model, in accordance with certain aspects of the present disclosure.

FIG. 9 illustrates an architecture 900 of an object motion model, in accordance with various aspects of the present disclosure. In aspects, the architecture 900 may include a training model 902 and a prediction model 904. In aspects, the training model 902 may include models for time steps—e.g., a first set of units 912a (e.g., LSTMs, neurons, etc.) for motion from to $t_0$ $t_1$, a second of units 912b for motion from $t_1$ to $t_2$, and a third set of units 912c for motion from $t_2$ to $t_3$. In the context of FIG. 8, the object motion model 802 may comprise the models 902, 904.

In various aspects, the training model 902 may include training an object motion model on sequences of frames that are ground truth, assuming the camera providing the frames is fixed. That is, the training model 902 may include supervised learning in which the training model 902 is provided a training dataset that includes a plurality of frames having bounding boxes 910, e.g., frames from time to $t_0$ time $t_3$. Each bounding box 910 may show the actual (e.g., observed) position of an object at a time $t_i$. That is, the first bounding box 910a may show the actual position of the object at time $t_0$, the second bounding box 910b may show the actual position of the object at time $t_1$, and so forth.

In various aspects, the first set of units 912a may be provided the first bounding box 910a as the input and the second bounding box 910b as the expected output. The first set of units 912a may be trained through supervised learning on the ground truths of the first bounding box 910a and the second bounding box 910b, in which the object is positioned at time $t_0$ and $t_1$, respectively. For example, one or more weights of the first set of units 912a may be adjusted.

Similarly, the second set of units 912b may be provided the second bounding box 910b as the input and the third bounding box 910c as the expected output. The second set of units 912b may further receive information (e.g., activations) from the first set of units 912a indicating motion of the object from time $t_0$ to $t_1$. The second set of units 912b may be trained through supervised learning on the ground truths of the second bounding box 910b and the third bounding box 910c. For example, one or more weights of the second set of units 912b may be adjusted.

Similarly, the third set of units 912c may be provided the third bounding box 910c as the input and the fourth bounding box 910d as the expected output. The third set of units 912c may further receive information (e.g., activations) from the second set of units 912b indicating motion of the object from time $t_1$ to $t_2$. The third set of units 912c may be trained through supervised learning on the ground truths of the third bounding box 910c and the fourth bounding box 910d. For example, one or more weights of the third set of units 912c may be adjusted.

From the training model 902, the prediction model 904 may be configured to model the motion of an object over time steps, e.g., time steps $t_6$ to $t_{11}$. Over the first one or more time steps (e.g., from time $t_6$ to $t_7$), the prediction model 904 may refrain from outputting the expected position of the object, as the motion of the object is modeled (e.g., in order to model velocity and/or acceleration, which are modeled over a plurality of time steps). In some aspects, the first one or more bounding boxes may be the ground truth of the position of the object, e.g., as detected by a CNN or other object identification system. For example, the first bounding box 920a may be the ground truth of the bounding box 920a at time $t_6$.

In various aspects, a first set of units 922a may model the motion of an object in the first bounding box 920a from time $t_6$ to $t_7$. Similarly, a second set of units 922b may model the motion of the object in the second bounding box 920b from time $t_7$ to $t_8$. The second set of units 922b may receive information indicating the modeled motion of the object from $t_6$ to $t_7$ from the first set of units 922a.

The third set of units 922c may model the motion of the object in the third bounding box 920c. The third set of units 922c may receive information indicating the modeled motion of the object from $t_1$ to $t_2$ from the second set of units 922b. For example, the third set of units 922c may obtain information indicating velocity and/or acceleration of the object. Accordingly, the third set of units 922c may model the motion of the object from $t_8$ to $t_9$, and may estimate the position of the object in a fourth bounding box 920d.

Similarly, the fourth set of units 922d may receive information indicating the modeled motion of the object from $t_8$ to $t_9$ from the third set of units 922c. For example, the fourth set of units 922d may obtain information indicating velocity and/or acceleration of the object. Accordingly, the fourth set of units 922d may model the motion of the object from $t_9$ to $t_{10}$, and may estimate the position of the object in a fifth bounding box 920e.

Similarly, the fifth set of units 922e may receive information indicating the modeled motion of the object from $t_9$ to $t_{10}$ from the fourth set of units 922d. For example, the fifth set of units 922e may obtain information indicating velocity and/or acceleration of the object. Accordingly, the fifth set of units 922e may model the motion of the object from $t_{10}$ to $t_{11}$, and may estimate the position of the object in a sixth bounding box 920f.

The prediction model 904 may output the estimated position of the object in one or more of the bounding boxes 920d, 920e, 920f In some aspects, the estimated position of the object may include a set of coordinates that indicates a search region. The estimated position may be provided to a camera motion model in order to update the estimated position based on the motion of the camera that captures the frames.

Figure 10:
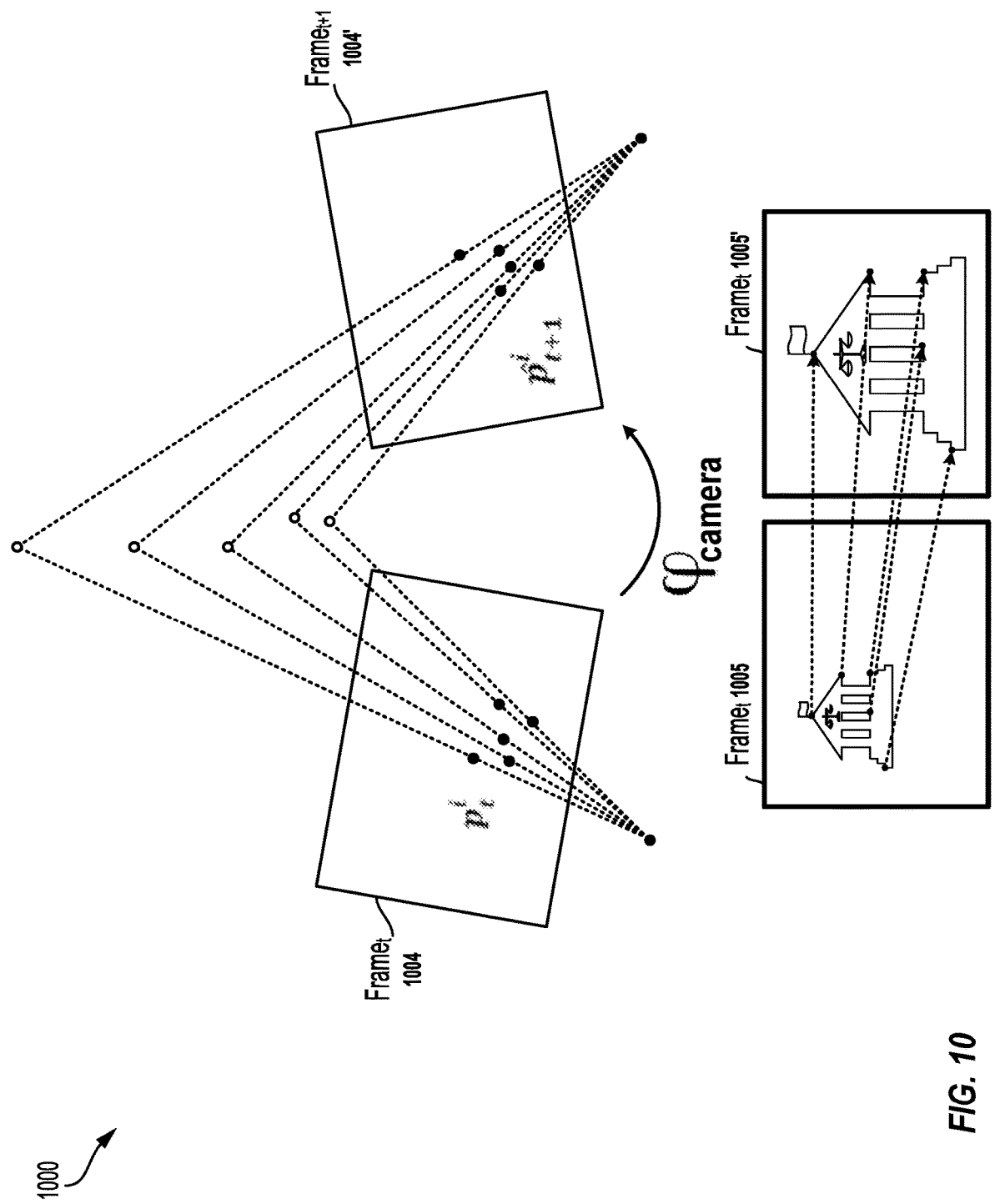
FIG. 10 is a block diagram illustrating minimization of re-projection error over point correspondences for a camera motion model, in accordance with certain aspects of the present disclosure.

Referring to FIG. 10, a point correspondence 1000 is illustrated. The point correspondence 1000 may be used for visual odometry by a camera motion model. In the context of FIG. 8, the camera motion model 804 may use point correspondence in order to model the motion of the camera 806.

A camera motion model may obtain the first frame 1004 at time t, and may obtain the second frame 1004' at time t+1. The first frame 1004 and the second frame 1004' may capture representations of a scene, as shown in the respectively corresponding frame 1005, 1005'. The camera motion model may identify a first set of points $p_t^i$ in the frame 1004 at time t. Further, the camera motion model may identify a second set of points $\hat{p}_{t+1}^i$ in the frame 1004' at time t+1. In aspects, the camera motion model may determine correspondence between each point of the first set of points $p_t^i$ and each point in the second set of points $\hat{p}_{t+1}^i$. For example, the camera motion model may match a first key point $p_t^1$ with a second key point $\hat{p}_{t+1}^1$. The camera motion model may determine correspondence between points using key point detectors, descriptors, and/or one or more matching functions.

With correspondence between each point of the first set of points $p_t^i$ and each point in the second set of points $\hat{p}_{t+1}^i$, the camera motion model may estimate homography between the frame 1004 at time t and the frame 1004' at time t+1. This estimation may be performed with at least five corresponding points. The camera motion model may then determine the motion of the camera based on the determined point correspondence (e.g., estimated homography). For example, the motion of the camera $\varphi_{camera}^*$ may be modeled as $$\underset{\varphi_{camera}}{\mathrm{argmin}} \sum_i \|\hat{p}_{t+1}^i - p_t^i\| : \varphi_{camera}^* = \underset{\varphi_{camera}}{\mathrm{argmin}} \sum_i \|\hat{p}_{t+1}^i - p_t^i\|.$$

Figure 11:
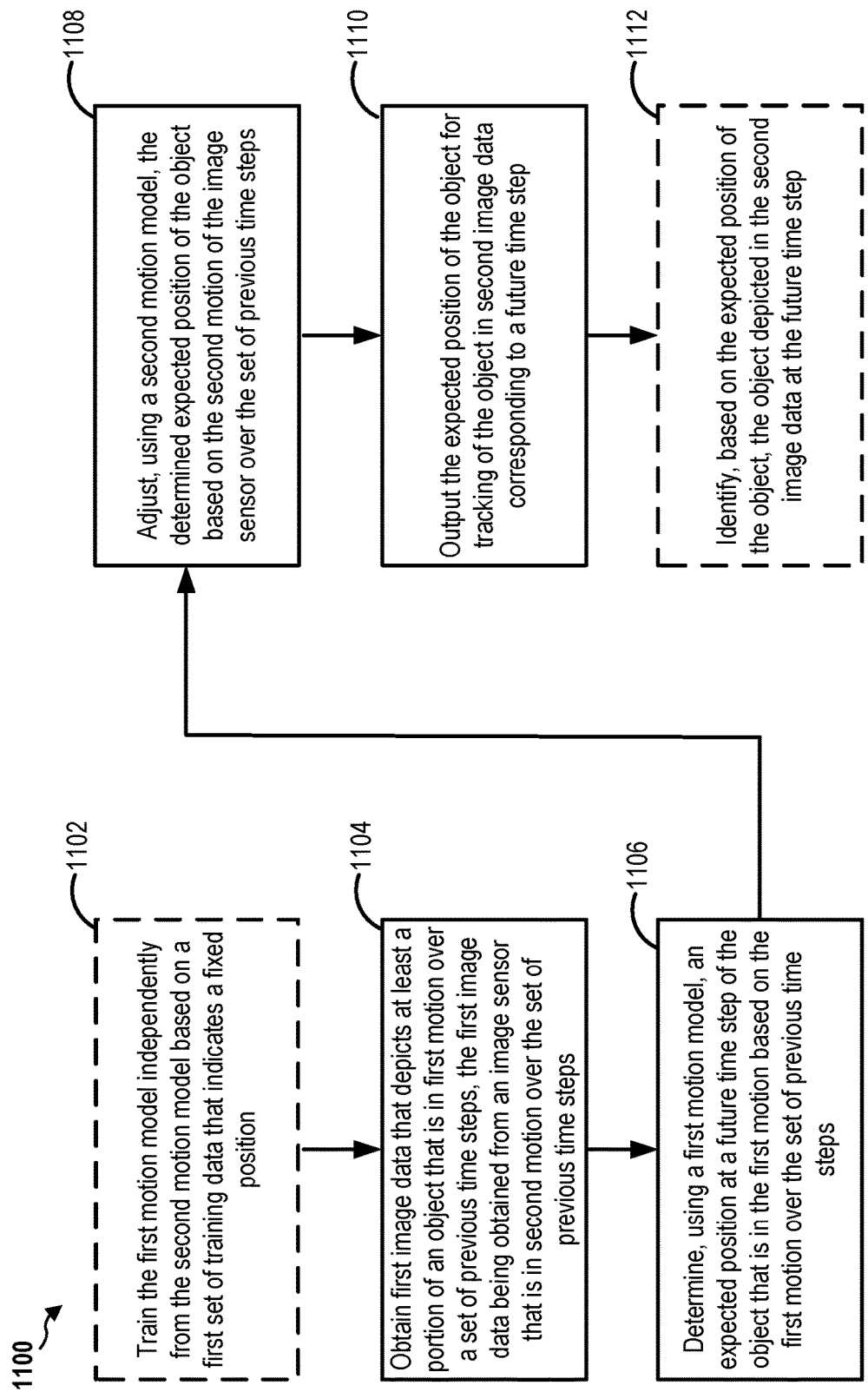
FIG. 11 is a flow diagram of a method for tracking an object, in accordance with certain aspects of the present disclosure.

FIG. 11 illustrates a method 1100 for tracking an object, in accordance with various aspects of the present disclosure. The method 1100 may be performed by an object-tracking system, such as the object-tracking system 602 of FIG. 6. The method 1100 may be performed by an object motion model that is decoupled from the camera motion model, such as the object motion model 802 and the camera motion model of FIG. 8. In various aspects, one or more of the operations may be omitted, transposed, and/or contemporaneously performed. Some potential optional operations may be illustrated with dashed lines.

At operation 1102, a first motion model may be trained independently from a second motion model based on a first set of training data that indicates a fixed position of the image sensor. For example, the first motion model may be an object motion model that is trained with supervised learning. The first motion model may be provided a set of bounding boxes that are ground truths indicating a position of an object over a plurality of times steps, and the first motion model may be trained on that set of bounding boxes that are ground truths.

In the context of FIG. 8, the object motion model 802 may be trained independently from the camera motion model 804 based on a first set of training data that indicates a fixed position of the camera 806. In the context of FIG. 9, the training model 902 may be trained for the sets of units 912 based on the bounding boxes 912 that show the ground truth position of the object.

At operation 1104, the first motion model may obtain first image data that depicts at least a portion of an object that is in first motion over a set of previous times steps. The first motion model may obtain the first image data from an image sensor that is in second motion over the set of previous time steps. In the context of FIG. 8, the object motion model 802 may obtain the image data 822 from the camera 806. In the context of FIG. 9, the prediction model 904 may obtain frames including bounding boxes 920 (e.g., bounding boxes 920a, 920b, 920c).

At operation 1106, the first motion model may determine an expected position at a future time step of the object that is in first motion based on the first motion over the set of previous times steps. For example, the first motion model may model the first motion of the object in order to estimate the position of the object in a next frame, and the first motion model may identify an expected position of the object in a next frame (e.g., the first motion model may identify a set of coordinates). In one aspect, the first motion model may determine the expected position by modeling the first motion based on at least one of a constant velocity or a constant acceleration associated with the object over the set of previous time steps. In aspects, the first motion model may determine the expected position based on an absence of the second motion of the image sensor over the set of previous time steps (e.g., the first motion model may assume that the image sensor is fixed). In one aspect, the first motion model includes at least one of an RNN or a Bayesian filter for modeling the first motion of the object to determine the expected position. In the context of FIG. 8, the object motion model 802 may determine 824 an expected position of the object in the bounding box 820" based on the motion of the object in the bounding boxes 820, 820', 820".

At operation 1108, a second motion model may adjust the determined expected position of the object based on the second motion of the image sensor over the set of previous time steps. In some aspects, the second motion model may model the motion of the camera over the set of previous time steps, and the second motion may change the expected position (e.g., set of coordinates) determined by the first motion model based on the modeled motion of the camera. In one aspect, the second motion model may be a camera motion model that models the second motion of the image sensor over the set of previous time steps. For example, the camera motion model may model the second motion of the image sensor over the set of previous time steps based on at least one of visual odometry and/or inertial odometry. The camera motion model may use a combination of visual and inertial odometry. In the context of FIG. 8, the camera motion model 804 may adjust 826 the expected position, determined by the object motion model 802 based on the motion of the camera 806 over the set of previous time steps.

At operation 1110, the second motion model may output the adjusted expected position of the object for tracking of the object in second image data that corresponds to a future time step. In an aspect, the adjusted expected position includes a search region (e.g., a set of coordinates for a frame). For example, the second motion model may identify a set of coordinates that indicate the adjusted expected position, and the second motion model may provide the set of coordinates to a visual tracker (e.g., through an interface). In the context of FIG. 8, the camera motion model 804 may provide the expected position 821 to the visual tracker 808.

At operation 1112, a visual tracker may identify the object depicted in the second image data at the future time step based on the expected position of the object. For example, the visual tracker may search within the search region indicating the expected position, the visual tracker may identify an object within the search region, and the visual tracker may determine whether the identified object corresponds to an object that is to be tracked. In the context of FIG. 8, the visual tracker 808 may identify 830 the object based on the expected position 821 in the frame 828, which may be included in second image data obtained from the camera 806.

Figure 12:
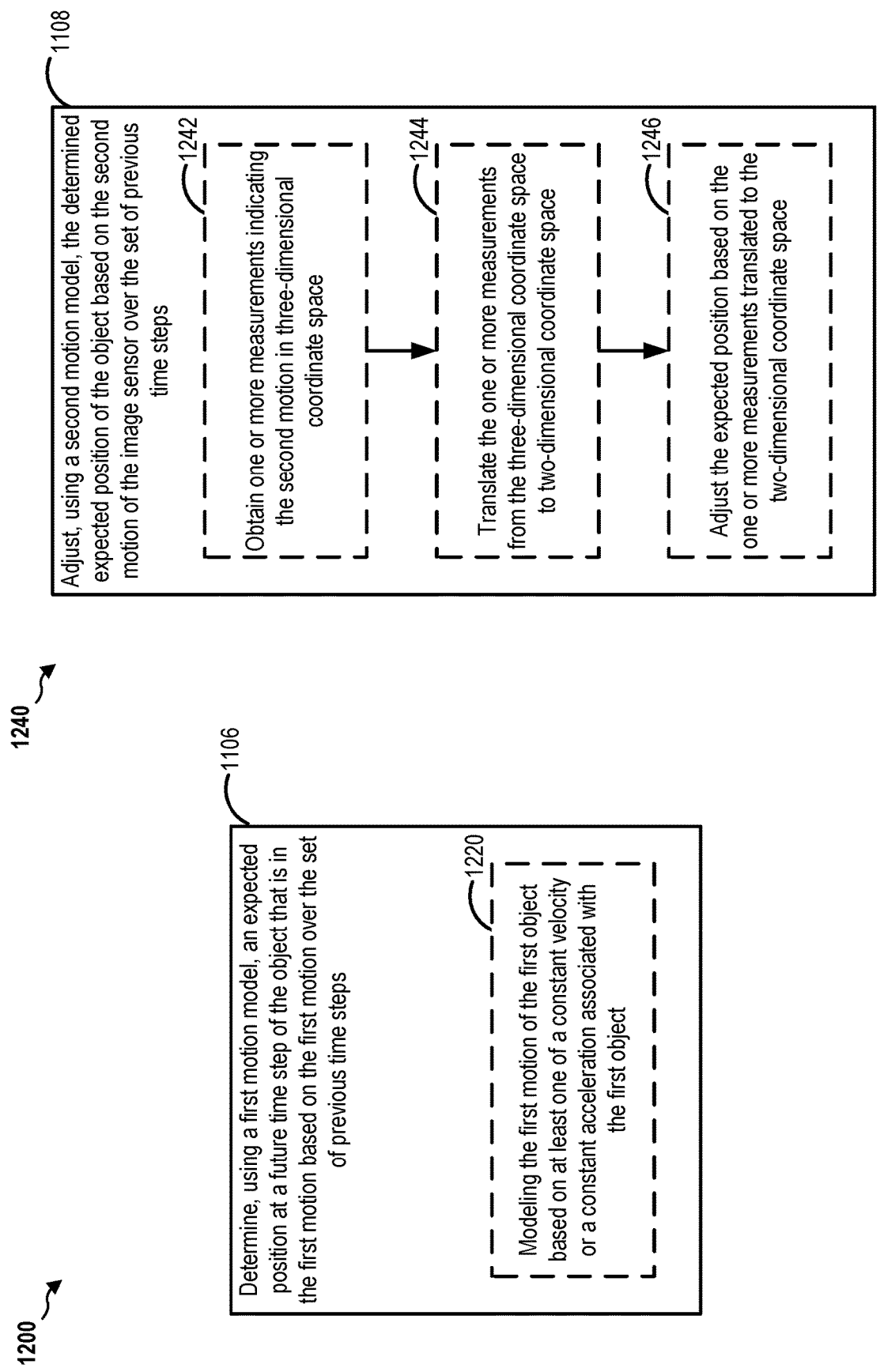
FIG. 12 is a flow diagram of a method for tracking an object, in accordance with certain aspects of the present disclosure.

FIG. 12 illustrates methods 1200, 1240 associated with the method 1100 of FIG. 11. In one aspect, operation 1106 of FIG. 11 may include modeling the first motion of the object based on at least one of a constant velocity and/or a constant acceleration, as shown at operation 1220 of the method 1200. For example, the first motion model may determine the velocity and/or acceleration of the object based on the change in position of the object over a plurality of previous time steps, depicted in the first image data. The first motion model may determine the expected position of the object at a future time step (e.g., in a next frame) based on the determined velocity and/or acceleration. In the context of FIG. 8, the object motion model 802 may model the first motion of the object in the bounding box 820" based at least one of a constant velocity and/or a constant acceleration (e.g., determined from the bounding boxes 820, 820', 820").

In one aspect, operation 1108 may include operation 1242, operation 1244, and operation 1246 of the method 1240. At operation 1242, the second motion model may obtain the one or more measurements indicating the second motion in 3D coordinate space. For example, the second motion model may receive, from an IMU, information indicating motion in 3D coordinate space, and the second motion model may determine that the information indicating the motion in 3D coordinate space is associated with the second motion of the image sensor. In the context of FIG. 8, the camera motion model 804 may obtain IMU measurement(s) associated with the camera 806, which may indicate 3D movement of the camera 806.

At operation 1244, the second motion model may translate the one or more measurements from 3D coordinate space to 2D coordinate space. For example, the second motion model may determine how 3D coordinates are to be mapped to 2D coordinates in an image plane, and the second motion model may determine a translation formula that is to be applied to translate 3D coordinates to 2D coordinates. In the context of FIG. 8, the camera motion model 804 may translate the one or more measurements from 3D coordinate space to 2D coordinate space.

At operation 1246, the second motion model may adjust the expected position based on the one or more measurements translated to 2D coordinate space. For example, the second motion model may change one or more coordinates (e.g., change at least one of [x, y, w, h]) of the set of coordinates based on the one or more measurements translated to 2D coordinate space. In the context of FIG. 8, the camera motion model 804 may adjust the expected position based the one or more measurements translated to the 2D coordinate space.

In one configuration, an apparatus may be configured for separately modeling motion of an object and modeling motion of a camera. The apparatus may be configured to obtain first image data that depicts at least a portion of an object that is in first motion over a set of previous time steps, and the first image data may be obtained from an image sensor that is in second motion over the set of previous time steps. The apparatus may be further configured to determine, using a first motion model, an expected position at a future time step of the object that is in the first motion based on the first motion over the set of previous time steps. The apparatus may be further configured to adjust, using a second motion model, the determined expected position of the object based on the second motion of the image sensor over the set of previous time steps. The apparatus may be further configured to output the expected position of the object for tracking of the object in second image data corresponding to a future time step.

In furtherance thereto, the apparatus may include means for obtaining first image data that depicts at least a portion of an object that is in first motion over a set of previous time steps, and the first image data may be obtained from an image sensor that is in second motion over the set of previous time steps. The means for obtaining first image data that depicts at least a portion of an object that is in first motion over a set of previous time steps may be the general-purpose processor 102, program memory associated with the general-purpose processor 102, memory block 118, local processing units 202, and or the routing connection processing units 216 configured to perform the functions recited. In another configuration, the aforementioned means may be any component or any apparatus configured to perform the functions recited by the aforementioned means. In another configuration, an algorithm to be performed by the aforementioned means may be described with respect to the method 1100.

The apparatus may include means for determining, using a first motion model, an expected position at a future time step of the object that is in the first motion based on the first motion over the set of previous time steps. The means for determining, using a first motion model, an expected position at a future time step of the object that is in the first motion based on the first motion over the set of previous time steps may be the general-purpose processor 102, program memory associated with the general-purpose processor 102, memory block 118, local processing units 202, and or the routing connection processing units 216 configured to perform the functions recited. In another configuration, the aforementioned means may be any component or any apparatus configured to perform the functions recited by the aforementioned means. In another configuration, an algorithm to be performed by the aforementioned means may be described with respect to the method 1100.

The apparatus may include means for determining, using a first motion model, an expected position at a future time step of the object that is in the first motion based on the first motion over the set of previous time steps. The means for determining, using a first motion model, an expected position at a future time step of the object that is in the first motion based on the first motion over the set of previous time steps may be the general-purpose processor 102, program memory associated with the general-purpose processor 102, memory block 118, local processing units 202, and or the routing connection processing units 216 configured to perform the functions recited. In another configuration, the aforementioned means may be any component or any apparatus configured to perform the functions recited by the aforementioned means. In another configuration, an algorithm to be performed by the aforementioned means may be described with respect to the method 1100 and/or the method 1200.

The apparatus may include means for adjusting, using a second motion model, the determined expected position of the object based on the second motion of the image sensor over the set of previous time steps. The means for adjusting, using a second motion model, the determined expected position of the object based on the second motion of the image sensor over the set of previous time steps may be the general-purpose processor 102, program memory associated with the general-purpose processor 102, memory block 118, local processing units 202, and or the routing connection processing units 216 configured to perform the functions recited. In another configuration, the aforementioned means may be any component or any apparatus configured to perform the functions recited by the aforementioned means. In another configuration, an algorithm to be performed by the aforementioned means may be described with respect to the method 1100 and/or the method 1240.

The apparatus may include means for outputting the expected position of the object for tracking of the object in second image data corresponding to a future time step. The means for outputting the expected position of the object for tracking of the object in second image data corresponding to a future time step may be the general-purpose processor 102, program memory associated with the general-purpose processor 102, memory block 118, local processing units 202, and or the routing connection processing units 216 configured to perform the functions recited. In another configuration, the aforementioned means may be any component or any apparatus configured to perform the functions recited by the aforementioned means. In another configuration, an algorithm to be performed by the aforementioned means may be described with respect to the method 1100.

The apparatus may include means for identifying, based on the expected position of the object, the object depicted in the second image data at the future time step. The means for identifying, based on the expected position of the object, the object depicted in the second image data at the future time step may be the general-purpose processor 102, program memory associated with the general-purpose processor 102, memory block 118, local processing units 202, and or the routing connection processing units 216 configured to perform the functions recited. In another configuration, the aforementioned means may be any component or any apparatus configured to perform the functions recited by the aforementioned means. In another configuration, an algorithm to be performed by the aforementioned means may be described with respect to the method 1100.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

In some aspects, methods 1100, 1200, and 1240 may be performed by the SOC 100 (FIG. 1) or the system 200 (FIG. 2). That is, each of the elements of methods 1100, 1200, and 1240 may, for example, but without limitation, be performed by the SOC 100 or the system 200 or one or more processors (e.g., CPU 102 and local processing unit 202) and/or other components included therein.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may include a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may include a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may include packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may include one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may include a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may include non-transitory computer-readable media (e.g., tangible media). In addition, for other aspects computer-readable media may include transitory computer-readable media (e.g., a signal). Combinations of the above should also be included within the scope of computer-readable media.

Thus, certain aspects may include a computer program product for performing the operations presented herein. For example, such a computer program product may include a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of tracking an object in motion, the method comprising:
    obtaining first image data that depicts at least a portion of an object that is in first motion over a set of previous time steps, the first image data being obtained from an image sensor that is in second motion over the set of previous time steps;
    determining, using a first motion model, an expected position at a future time step of the object that is in the first motion based on the first motion over the set of previous time steps, wherein the determining comprises modeling the first motion of the object based on at least one of a determined velocity or a determined acceleration associated with the object over the set of previous time steps;
    adjusting, using a second motion model, the determined expected position of the object based on the second motion of the image sensor over the set of previous time steps; and
    outputting the expected position of the object for tracking of the object in second image data corresponding to the future time step.

2. The method of claim 1, wherein the expected position of the object indicates a search region for a future frame at the future time step.

3. The method of claim 1, wherein the first motion model comprises an object motion model that is based on absence of the second motion of the image sensor over the set of previous time steps.

4. The method of claim 3, wherein the object motion model comprises at least one of a recurrent neural network (RNN) or a Bayesian filter.

5. The method of claim 1, wherein the determining comprises:
    modeling the first motion of the object based on at least one of a constant velocity or a constant acceleration associated with the object over the set of previous time steps.

6. The method of claim 1, wherein the second motion model comprises a camera motion model that models the second motion of the image sensor over the set of previous time steps.

7. The method of claim 6, wherein the camera motion model models the second motion of the image sensor over the set of previous time steps based on at least one of visual odometry or inertial odometry.

8. The method of claim 1, wherein the adjusting, using the second motion model, the determined expected position of the object based on the second motion of the image sensor over the set of previous time steps comprises:
    obtaining one or more measurements indicating the second motion in three-dimensional coordinate space;
    translating the one or more measurements from the three-dimensional coordinate space to two-dimensional coordinate space; and
    adjusting the expected position based on the one or more measurements translated to the two-dimensional coordinate space.

9. The method of claim 1, further comprising:
    training the first motion model independently from the second motion model based on a first set of training data that indicates a fixed position of the image sensor.

10. The method of claim 1, further comprising:
    identifying, based on the expected position of the object, the object depicted in the second image data at the future time step.

11. An apparatus for tracking an object in motion, the apparatus comprising:
    a memory; and
    at least one processor coupled to the memory and configured to:
        obtain first image data that depicts at least a portion of an object that is in first motion over a set of previous time steps, the first image data being obtained from an image sensor that is in second motion over the set of previous time steps;
        determine, using a first motion model, an expected position at a future time step of the object that is in the first motion based on the first motion over the set of previous time steps, wherein the determining comprises modeling the first motion of the object based on at least one of a determined velocity or a determined acceleration associated with the object over the set of previous time steps;
        adjust, using a second motion model, the determined expected position of the object based on the second motion of the image sensor over the set of previous time steps; and
        output the expected position of the object for tracking of the object in second image data corresponding to the future time step.

12. The apparatus of claim 11, wherein the expected position of the object indicates a search region for a future frame at the future time step.

13. The apparatus of claim 11, wherein the first motion model comprises an object motion model that is based on absence of the second motion of the image sensor over the set of previous time steps.

14. The apparatus of claim 13, wherein the object motion model comprises at least one of a recurrent neural network (RNN) or a Bayesian filter.

15. The apparatus of claim 11, wherein the determining comprises:
    modeling the first motion of the object based on at least one of a constant velocity or a constant acceleration associated with the object over the set of previous time steps.

16. The apparatus of claim 11, wherein the second motion model comprises a camera motion model that models the second motion of the image sensor over the set of previous time steps.

17. The apparatus of claim 16, wherein the camera motion model models the second motion of the image sensor over the set of previous time steps based on at least one of visual odometry or inertial odometry.

18. The apparatus of claim 11, wherein the adjustment, using the second motion model, of the determined expected position of the object based on the second motion of the image sensor over the set of previous time steps comprises to:
obtain one or more measurements indicating the second motion in three-dimensional coordinate space;
translate the one or more measurements from the three-dimensional coordinate space to two-dimensional coordinate space; and
adjust the expected position based on the one or more measurements translated to the two-dimensional coordinate space.

19. The apparatus of claim 11, wherein the at least one processor is further configured to:
train the first motion model independently from the second motion model based on a first set of training data that indicates a fixed position of the image sensor.

20. The apparatus of claim 11, wherein the at least one processor is further configured to:
identify, based on the expected position of the object, the object depicted in the second image data at the future time step.

21. An apparatus for tracking an object in motion, the apparatus comprising:
means for obtaining first image data that depicts at least a portion of an object that is in first motion over a set of previous time steps, the first image data being obtained from an image sensor that is in second motion over the set of previous time steps;
means for determining, using a first motion model, an expected position at a future time step of the object that is in the first motion based on the first motion over the set of previous time steps, wherein the means for determining is configured to model the first motion of the object based on at least one of a determined velocity or a determined acceleration associated with the object over the set of previous time steps;
means for adjusting, using a second motion model, the determined expected position of the object based on the second motion of the image sensor over the set of previous time steps; and
means for outputting the expected position of the object for tracking of the object in second image data corresponding to the future time step.

22. The apparatus of claim 21, wherein the expected position of the object indicates a search region for a future frame at the future time step.

23. The apparatus of claim 21, wherein the first motion model comprises an object motion model that is based on absence of the second motion of the image sensor over the set of previous time steps.

24. The apparatus of claim 23, wherein the object motion model comprises at least one of a recurrent neural network (RNN) or a Bayesian filter.

25. The apparatus of claim 21, wherein the means for determining is configured to:
model the first motion of the object based on at least one of a constant velocity or a constant acceleration associated with the object over the set of previous time steps.

26. The apparatus of claim 21, wherein the second motion model comprises a camera motion model that models the second motion of the image sensor over the set of previous time steps.

27. The apparatus of claim 26, wherein the camera motion model models the second motion of the image sensor over the set of previous time steps based on at least one of visual odometry or inertial odometry.

28. The apparatus of claim 21, wherein the means for adjusting, using the second motion model, the determined expected position of the object based on the second motion of the image sensor over the set of previous time steps is configured to:
obtain one or more measurements indicating the second motion in three-dimensional coordinate space;
translate the one or more measurements from the three-dimensional coordinate space to two-dimensional coordinate space; and
adjust the expected position based on the one or more measurements translated to the two-dimensional coordinate space.

29. The apparatus of claim 21, further comprising:
means for identifying, based on the expected position of the object, the object depicted in the second image data at the future time step.

30. A non-transitory computer-readable medium storing computer-executable code for tracking an object in motion using two motion models, comprising code to:
obtain first image data that depicts at least a portion of an object that is in first motion over a set of previous time steps, the first image data being obtained from an image sensor that is in second motion over the set of previous time steps;
determine, using a first motion model, an expected position at a future time step of the object that is in the first motion based on the first motion over the set of previous time steps, wherein the code to determine comprises to model the first motion of the object based on at least one of a determined velocity or a determined acceleration associated with the object over the set of previous time steps;
adjust, using a second motion model, the determined expected position of the object based on the second motion of the image sensor over the set of previous time steps; and
output the expected position of the object for tracking of the object in second image data corresponding to the future time step.

* * * * *